(12) United States Patent
van Os et al.

(10) Patent No.: US 11,354,034 B2
(45) Date of Patent: Jun. 7, 2022

(54) DEVICES, METHODS, AND GRAPHICAL USER INTERFACES FOR SELECTING AND INTERACTING WITH DIFFERENT DEVICE MODES

(71) Applicant: Apple Inc., Cupertino, CA (US)

(72) Inventors: Marcel van Os, Santa Cruz, CA (US); Donald W. Pitschell, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/112,883

(22) Filed: Dec. 4, 2020

(65) Prior Publication Data

US 2021/0216201 A1  Jul. 15, 2021

Related U.S. Application Data

(63) Continuation of application No. 16/730,921, filed on Dec. 30, 2019, now Pat. No. 10,860,207, which is a
(Continued)

(51) Int. Cl.
*G06F 3/0488* (2022.01)
*G06F 3/04883* (2022.01)
(Continued)

(52) U.S. Cl.
CPC ........ *G06F 3/04883* (2013.01); *G06F 1/3206* (2013.01); *G06F 3/0484* (2013.01);
(Continued)

(58) Field of Classification Search
CPC .. G06F 3/04883; G06F 3/0488; G06F 3/0484; G06F 3/04847; G06F 3/016;
(Continued)

(56) References Cited

U.S. PATENT DOCUMENTS 9,847,999 B2   12/2017   Van Os et al.
10,055,634 B2   8/2018   Han et al.
(Continued)

OTHER PUBLICATIONS

Notice of Allowance, dated Apr. 19, 2019, received in U.S. Appl. No. 15/707,757 (7315), 8 pages.
(Continued)

*Primary Examiner* — Vijay Shankar
(74) *Attorney, Agent, or Firm* — Morgan, Lewis & Bockius LLP

(57) ABSTRACT

A computing device, in response to receiving a request to edit a first mode, received while displaying a graphical indication of the first mode, displays a first editing user interface that includes a plurality of editable settings for the first mode, including a visual representation of a setting for whether or not notifications for a first application are permitted to be output during the first mode, and detects one or more user inputs that change the setting. After exiting the first editing user interface and activating the first mode, in response to detecting occurrence of an event corresponding to the first application, a notification corresponding to the event is output, or not, in accordance with a determination that the setting permits, or does not permit, notifications for the first application to be output while the computing device is in the first mode.

24 Claims, 37 Drawing Sheets

Related U.S. Application Data continuation of application No. 15/707,757, filed on Sep. 18, 2017, now Pat. No. 10,521,107.

(60) Provisional application No. 62/399,394, filed on Sep. 24, 2016.

(51) Int. Cl.
*G06F 1/3206* (2019.01)
*H04W 4/029* (2018.01)
*G06F 3/0484* (2022.01)
*G06F 3/04847* (2022.01)

(52) U.S. Cl.
CPC ........ *G06F 3/0488* (2013.01); *G06F 3/04847* (2013.01); *H04W 4/029* (2018.02)

(58) Field of Classification Search
CPC .. G06F 1/3206; G06F 2203/014; H04W 4/02; H04W 4/029
See application file for complete search history.

(56) References Cited

U.S. PATENT DOCUMENTS

| | | | |
|---|---|---|---|
| 10,198,073 | B2 | 2/2019 | Chaudhri et al. |
| 10,228,815 | B2 | 3/2019 | Forstall et al. |
| 10,334,054 | B2 | 6/2019 | Van Os et al. |
| 10,521,107 | B2 * | 12/2019 | van Os .................. G06F 3/016 |
| 10,860,207 | B2 * | 12/2020 | van Os .................. G06F 3/016 |
| 2018/0032220 | A1 | 2/2018 | Anzures et al. |
| 2018/0088795 | A1 | 3/2018 | Van Os et al. |
| 2018/0109629 | A1 | 4/2018 | Van Os et al. |
| 2018/0121409 | A1 | 5/2018 | Karunamuni et al. |
| 2019/0289079 | A1 | 9/2019 | Van Os et al. |
| 2020/0133477 | A1 | 4/2020 | Van Os et al. |

OTHER PUBLICATIONS

Notice of Allowance, dated Aug. 6, 2019, received in U.S. Appl. No. 15/707,757 (7315), 8 pages.
Office Action, dated Jul. 13, 2020, received in U.S. Appl. No. 16/730,921 (7668), 7 pages.
Notice of Allowance, dated Jul. 29, 2020, received in U.S. Appl. No. 16/730,921 (7668), 8 pages.

* cited by examiner

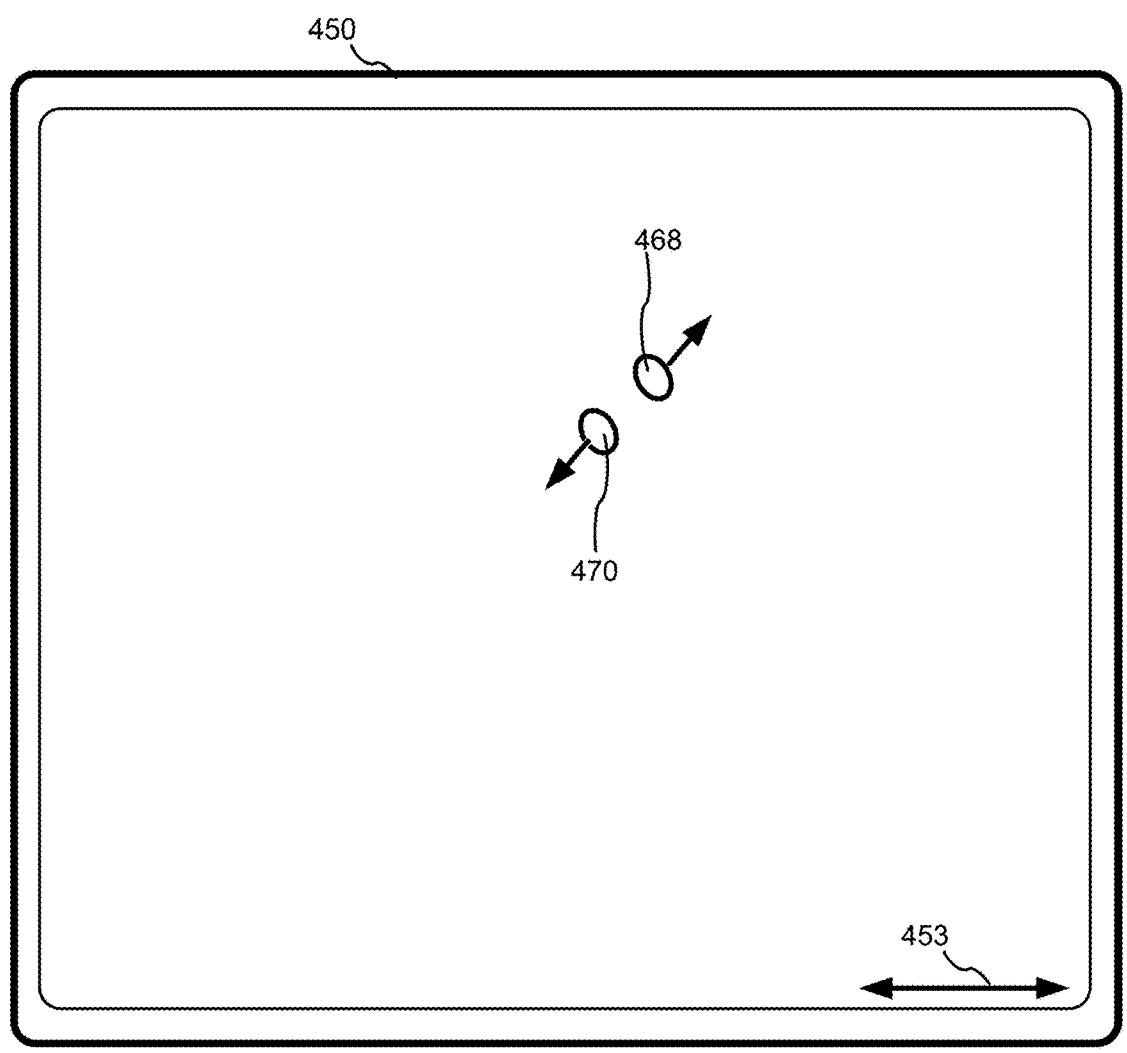
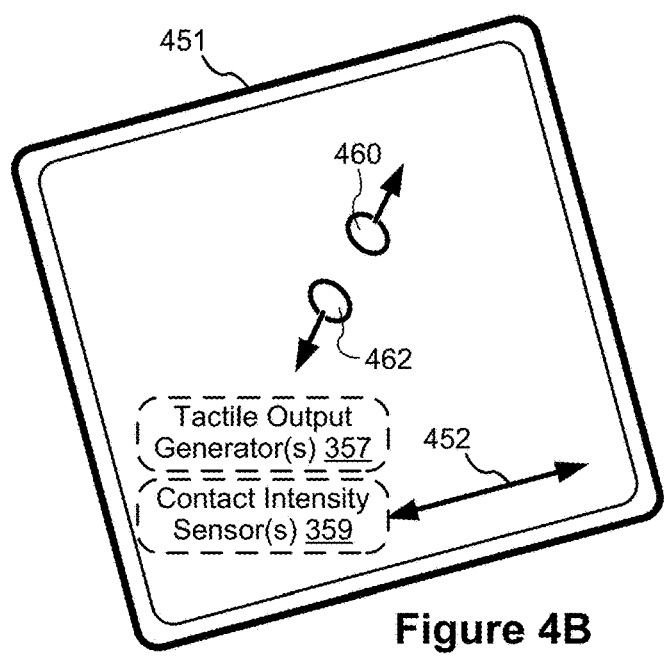
Figure 4B

600

602
Display a first mode of a plurality of modes of a device, wherein:

604
The plurality of modes of the device includes the first mode and a second mode

606
The first mode of the device is active when a first set of time and/or device location criteria are met

608
The second mode of the device is active when a second set of time and/or device location criteria, distinct from the first set of time and/or device location criteria, are met

610
While the first set of time and/or device location criteria are met:

612
While the first mode of the device is active, detect a first input that overrides the first mode of the device.

614
In response to detecting the first input, activate the second mode of the device

616
After responding to the first input, while the second mode of the device is active, detect a second input

618
In response to detecting the second input, perform an operation in the second mode of the device

620
After performing the operation in the second mode of the device, return to the first mode of the device

622
Performing the operation in the second mode of the device includes adding an affordance to the second mode of the device

624
After returning to the first mode of the device, determining that the second set of time and/or device location criteria are met; and, in response to determining that the second set of time and/or device location criteria are met: activate and display the second mode of the device; and display the affordance in the second mode of the device

---

626
Overriding the first mode includes ceasing to display the first mode of the device and displaying the second mode of the device

---

628
A respective mode of the plurality of modes includes one or more affordances, and the one or more affordances includes: an application affordance that, when activated, initiates an application; a media affordance, that, when activated, initiates playback of content; a control affordance, that, when activated, initiates a function; and/or an information affordance that displays information

---

630
Performing the operation in the second mode of the device includes modifying a setting for a parameter in the second mode of the device

632
After returning to the first mode of the device, determining that the second set of time and/or device location criteria are met; in response to determining that the second set of time and/or location criteria are met: initiating the second mode of the device; and, applying the setting to the parameter of the device

634
Overriding the first mode includes applying the setting to the parameter of the device in the second mode

636
Returning to the first mode of the device includes automatically returning to the first mode of the device after a predetermined period of time

---

638
While the second mode is active, detecting a third input; and, in response to detecting the third input, re-activating the first mode of the device

---

640
Detecting the first input includes detecting a gesture at a mode selection affordance

---

642
The mobile device includes a touch-sensitive surface and one or more sensors for detecting intensity of contacts on the touch-sensitive surface, the method including: while a focus selector is at a location of a mode selection affordance, detecting an increase in a characteristic intensity of the contact on the touch-sensitive surface above a mode display intensity threshold; and, in response to detecting the increase in the characteristic intensity of the contact above the mode display intensity threshold, displaying a plurality of mode affordances that correspond to at least a subset of the plurality of modes of the device; wherein detecting the first input includes receiving a selection of a mode affordance that corresponds to the second mode

---

644
The first mode is a work mode and the second mode is a home mode

---

646
The first set of time and/or device location criteria are met when at least one of a work time criterion or a work location criterion is satisfied, a work time criterion is satisfied when a current time is within work time parameters; and a work location criterion is satisfied when a current location of the device is within work location parameters

702
Concurrently display a plurality of mode affordances, wherein:

704
The plurality of mode affordances includes a first mode affordance that, when activated, initiates a first mode of the mobile device

706
The plurality of mode affordances includes a second mode affordance that, when activated, initiates a second mode of the mobile device, distinct from the first mode of the mobile device

708
The mobile device is configured to recommend activating a respective mode of the device in accordance with a determination that a respective set of time and/or device location criteria that correspond to the respective mode of the device are met

710
Determine that a first set of time and/or device location criteria that correspond to the first mode of the device are met

712
In response to determining that the first set of time and/or device location criteria are met, display a visual indication that corresponds to a recommendation to activate the first mode of the device

714
While the first set of time and/or device location criteria are met and the visual indication that corresponds to the recommendation to activate the first mode of the device is displayed, detect activation of a respective mode affordance in the plurality of concurrently displayed mode affordances

716
In response to detecting activation of the respective mode affordance in the plurality of concurrently displayed mode affordances: cease to display the plurality of mode affordances; and activate a mode of the device that corresponds to the respective mode affordance

718
Displaying the visual indication that corresponds to the recommendation to activate the first mode of the device, in response to determining that the first set of time and/or device location criteria are met, occurs while maintaining concurrent display of the plurality of mode affordances

---

720
In accordance with a determination that the respective mode is a vehicle operation mode, a displayed area of at least one affordance is increased from a default area to a vehicle operation mode area that is larger than the default area.

---

722
Detecting activation of the respective mode affordance includes detecting a gesture at a location of the respective mode affordance

---

724
The mobile device includes a microphone; and detecting activation of the respective mode affordance includes detecting a voice command that indicates the respective mode affordance.

---

726
Determining whether the first set of time and/or device location criteria are met includes: determining a current time at the device, and determining whether the current time is within time parameters for the first mode; and in accordance with a determination that the current time is within the time parameters for the first mode, determining that the first set of time and/or device location criteria are met.

---

728
Determining whether the first set of time and/or device location criteria are met includes: determining a current location of the device, and determining whether the current location is within location parameters for the first mode; and in accordance with a determination that the current location is within the location parameters for the first mode, determining that the first set of time and/or device location criteria are met

---

730
Determining whether the first set of time and/or device location criteria are met includes determining whether device movement meets movement criteria

Figure 7B

DEVICES, METHODS, AND GRAPHICAL USER INTERFACES FOR SELECTING AND INTERACTING WITH DIFFERENT DEVICE MODES

RELATED APPLICATIONS

This application is a continuation of U.S. application Ser. No. 16/730,921, filed Dec. 30, 2019, which is a continuation of U.S. application Ser. No. 15/707,757, filed Sep. 18, 2017, now U.S. Pat. No. 10,521,107, which claims priority to U.S. Provisional Application Ser. No. 62/399,394, filed Sep. 24, 2016, each of which is incorporated herein by reference in its entirety.

TECHNICAL FIELD

This relates generally to electronic devices, including but not limited to electronic devices that provide different operating modes with context-based functionality.

BACKGROUND

The use of portable electronic devices has increased significantly in recent years. Example portable electronic devices include smart watches, mobile phones, tablets, and laptops.

As portable devices become more integrated into a user's daily activities, the number of functions with which a user regularly interacts grows. One way to manage the growing number of regularly used applications, content, and device settings is to have different operating modes for the device (e.g., a work mode, a home mode, a driving mode, and/or a workout mode) that group together regularly used functions/applications in a tailored user interface for a given mode. However, conventional methods for selecting and interacting with different device modes are tedious and inefficient. In addition, selecting and interacting with different device modes takes longer than necessary, thereby wasting energy. This latter consideration is particularly important in battery-operated devices.

SUMMARY

Accordingly, there is a need for portable electronic devices with faster, more efficient methods and interfaces for selecting and interacting with different device modes. Such methods and interfaces optionally complement or replace conventional methods for selecting and interacting with different device modes. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for portable electronic devices are reduced or eliminated by the disclosed devices. In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display. The method includes: displaying a first mode of a plurality of modes of the device, wherein: the plurality of modes of the device includes the first mode and a second mode; the first mode of the device is active when a first set of time and/or device location criteria are met; and the second mode of the device is active when a second set of time and/or device location criteria, distinct from the first set of time and/or device location criteria, are met; and, while the first set of time and/or device location criteria are met: while the first mode of the device is active, detecting a first input that overrides the first mode of the device; in response to detecting the first input, activating the second mode of the device; after responding to the first input, while the second mode of the device is active, detecting a second input; in response to detecting the second input, performing an operation in the second mode of the device; and, after performing the operation in the second mode of the device, returning to the first mode of the device.

In accordance with some embodiments, a method is performed at an electronic device with a display. The method includes: concurrently displaying a plurality of mode affordances, wherein: the plurality of mode affordances includes a first mode affordance that, when activated, initiates a first mode of the mobile device; the plurality of mode affordances includes a second mode affordance that, when activated, initiates a second mode of the mobile device, distinct from the first mode of the mobile device; and the mobile device is configured to recommend activating a respective mode of the device in accordance with a determination that a respective set of time and/or device location criteria that correspond to the respective mode of the device are met; determining that a first set of time and/or device location criteria that correspond to the first mode of the device are met; in response to determining that the first set of time and/or device location criteria are met, displaying a visual indication that corresponds to a recommendation to activate the first mode of the device; while the first set of time and/or device location criteria are met and the visual indication that corresponds to the recommendation to activate the first mode of the device is displayed, detecting activation of a respective mode affordance in the plurality of concurrently displayed mode affordances; and, in response to detecting activation of the respective mode affordance in the plurality of concurrently displayed mode affordances: ceasing to display the plurality of mode affordances; and activating a mode of the device that corresponds to the respective mode affordance.

In accordance with some embodiments, an electronic device includes a display unit and a processing unit coupled with the display unit. The processing unit is configured to: enable display a first mode of a plurality of modes of the device, wherein: the plurality of modes of the device includes the first mode and a second mode; the first mode of the device is active when a first set of time and/or device location criteria are met; and the second mode of the device is active when a second set of time and/or device location criteria, distinct from the first set of time and/or device location criteria, are met; and, while the first set of time and/or device location criteria are met: while the first mode of the device is active, detect a first input that overrides the first mode of the device; in response to detecting the first input, activate the second mode of the device; after responding to the first input, while the second mode of the device is active, detect a second input; in response to detecting the second input, perform an operation in the second mode of the device; and, after performing the operation in the second mode of the device, return to the first mode of the device.

In accordance with some embodiments, an electronic device includes a display unit and a processing unit coupled with the display unit. The processing unit is configured to: concurrently enable display of a plurality of mode affordances, wherein: the plurality of mode affordances includes a first mode affordance that, when activated, initiates a first mode of the mobile device; the plurality of mode affordances includes a second mode affordance that, when activated, initiates a second mode of the mobile device, distinct from the first mode of the mobile device; and the mobile device is configured to recommend activating a respective mode of the device in accordance with a determination that a respective set of time and/or device location criteria that correspond to the respective mode of the device are met; determine that a first set of time and/or device location criteria that correspond to the first mode of the device are met; in response to determining that the first set of time and/or device location criteria are met, enable display of a visual indication that corresponds to a recommendation to activate the first mode of the device; while the first set of time and/or device location criteria are met and the visual indication that corresponds to the recommendation to activate the first mode of the device is displayed, detect activation of a respective mode affordance in the plurality of concurrently displayed mode affordances; and, in response to detecting activation of the respective mode affordance in the plurality of concurrently displayed mode affordances: cease to display the plurality of mode affordances; and activate a mode of the device that corresponds to the respective mode affordance.

In accordance with some embodiments, an electronic device includes a display, optionally a touch-sensitive surface, optionally one or more sensors to detect intensities of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, optionally a touch-sensitive surface, and optionally one or more sensors to detect intensities of contacts with the touch-sensitive surface, cause the device to perform or cause performance of the operations of any of the methods described herein. In accordance with some embodiments, a graphical user interface on an electronic device with a display, optionally a touch-sensitive surface, optionally one or more sensors to detect intensities of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, optionally a touch-sensitive surface, and optionally one or more sensors to detect intensities of contacts with the touch-sensitive surface; and means for performing or causing performance of the operations of any of the methods described herein. In accordance with some embodiments, an information processing apparatus, for use in an electronic device with a display, optionally a touch-sensitive surface, and optionally one or more sensors to detect intensities of contacts with the touch-sensitive surface, includes means for performing or causing performance of the operations of any of the methods described herein.

Thus, electronic devices with displays, optionally touch-sensitive surfaces, and optionally one or more sensors to detect intensities of contacts with the touch-sensitive surface are provided with faster, more efficient methods and interfaces for selecting and interacting with different device modes, thereby increasing the effectiveness, efficiency, and user satisfaction with such devices. Such methods and interfaces may complement or replace conventional methods for selecting and interacting with different device modes.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 6A-6C are flow diagrams illustrating a method of overriding a device mode in accordance with some embodiments.

FIGS. 7A-7B are flow diagrams illustrating a method of recommending and activating a device mode in accordance with some embodiments.

DESCRIPTION OF EMBODIMENTS

Figure 1A:
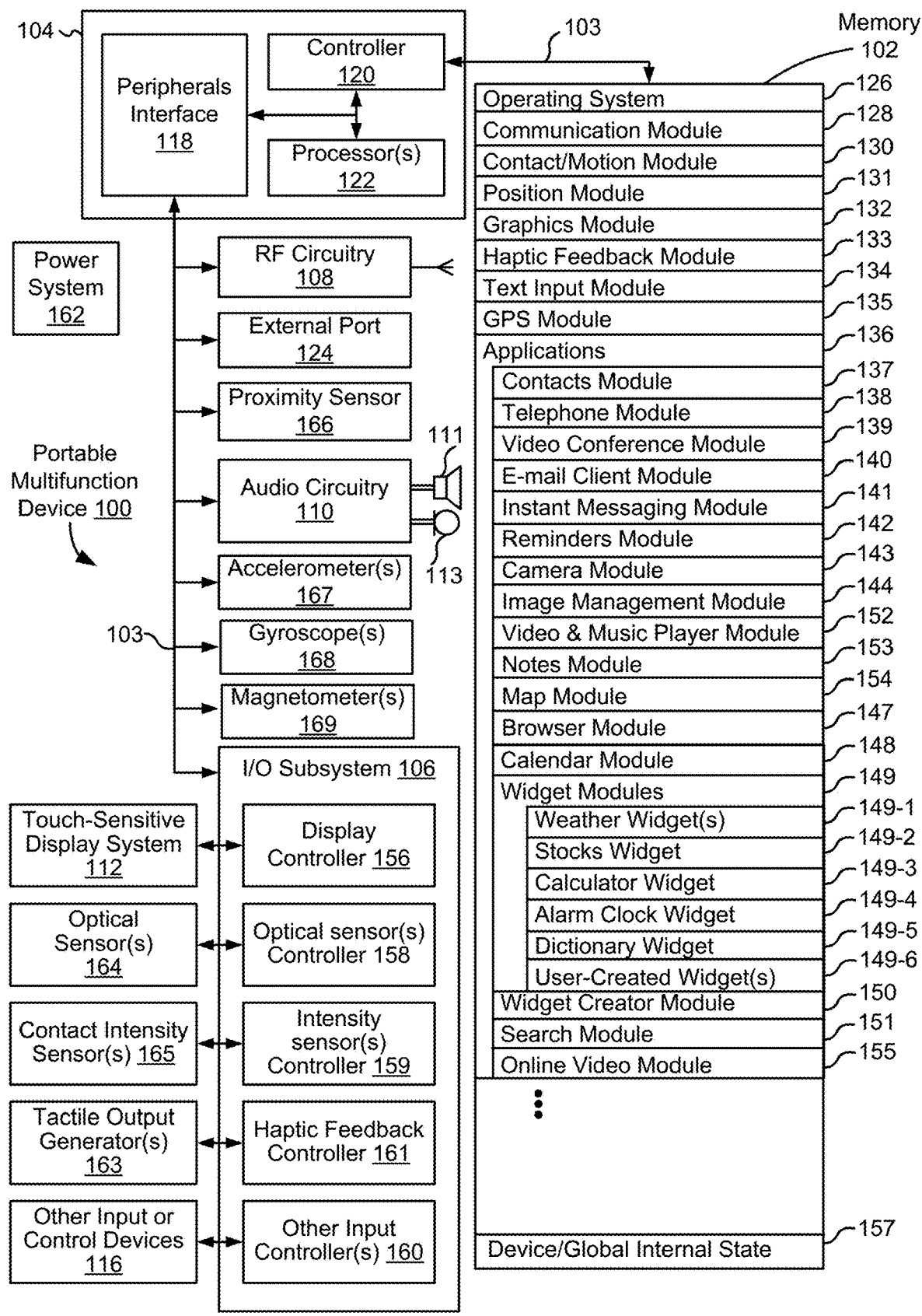
FIG. 1A is a block diagram illustrating a portable multifunction device with a touch-sensitive display in accordance with some embodiments.

Many portable electronic devices have a large number of features including applications, controls, and content with which a user engages, as well as settings that impact the functionality of the electronic device. A user may typically use different device features depending on contextual factors such as the time of day and/or the user's location. For example, at home, a user may frequently use applications related to entertainment, media delivery, and home automation, while these applications are less frequently accessed when the user is at work. Applications related to appointment scheduling and communication may play a larger role in device usage while the user is at work, as compared with other contexts. Within a particular communications application, such as a messaging application, a user may wish to view messages from contacts the user associates with a particular setting only when the user is present within that setting. The user may prefer for a device to always establish a connection to a particular network or network type in some contexts, and to connect to that network or network type only on an opt-in basis in other contexts. Device modes are a way to tie device features such as applications, controls, content, and settings to particular contexts (e.g., work, home, driving, or workout). A mobile device may use information such as time and device location to determine a device mode and apply and/or display a particular set of features that are desirable in that device mode. This streamlines access to device features, thereby reducing or eliminating the time spent by a user navigating user interfaces to locate desired features.

Here, improved ways to select device modes and interact with device modes are described.

In some embodiments, the device displays a plurality of mode icons (e.g., on a lock screen or wake screen), and visually highlights the mode icon that corresponds to the mode automatically recommended by the device (e.g., based on time and/or device location criteria), which helps the user to select the proper mode. The user then selects the recommended mode icon or another mode icon to activate the corresponding mode.

In some embodiments, while in a first device mode, the device detects an input that overrides the first mode and activates a second mode. The device performs an operation while in the second mode in response to another input, and then returns to the first mode. This method helps a user to interact with different modes. The user can easily leave a first mode, perform an operation in a second mode, and then return to the first mode.

Below, FIGS. 1A-1B, 2, and 3 provide a description of example devices. FIGS. 4A-4B and 5A-5U illustrate example user interfaces for interacting with device modes. FIGS. 6A-6C illustrate a flow diagram of a method of overriding a device mode. FIGS. 7A-7B illustrate a flow diagram of a method of recommending and activating a device mode from among a plurality of displayed mode affordances. The user interfaces in FIGS. 5A-5U are used to illustrate the processes in FIGS. 6A-6C and 7A-7B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
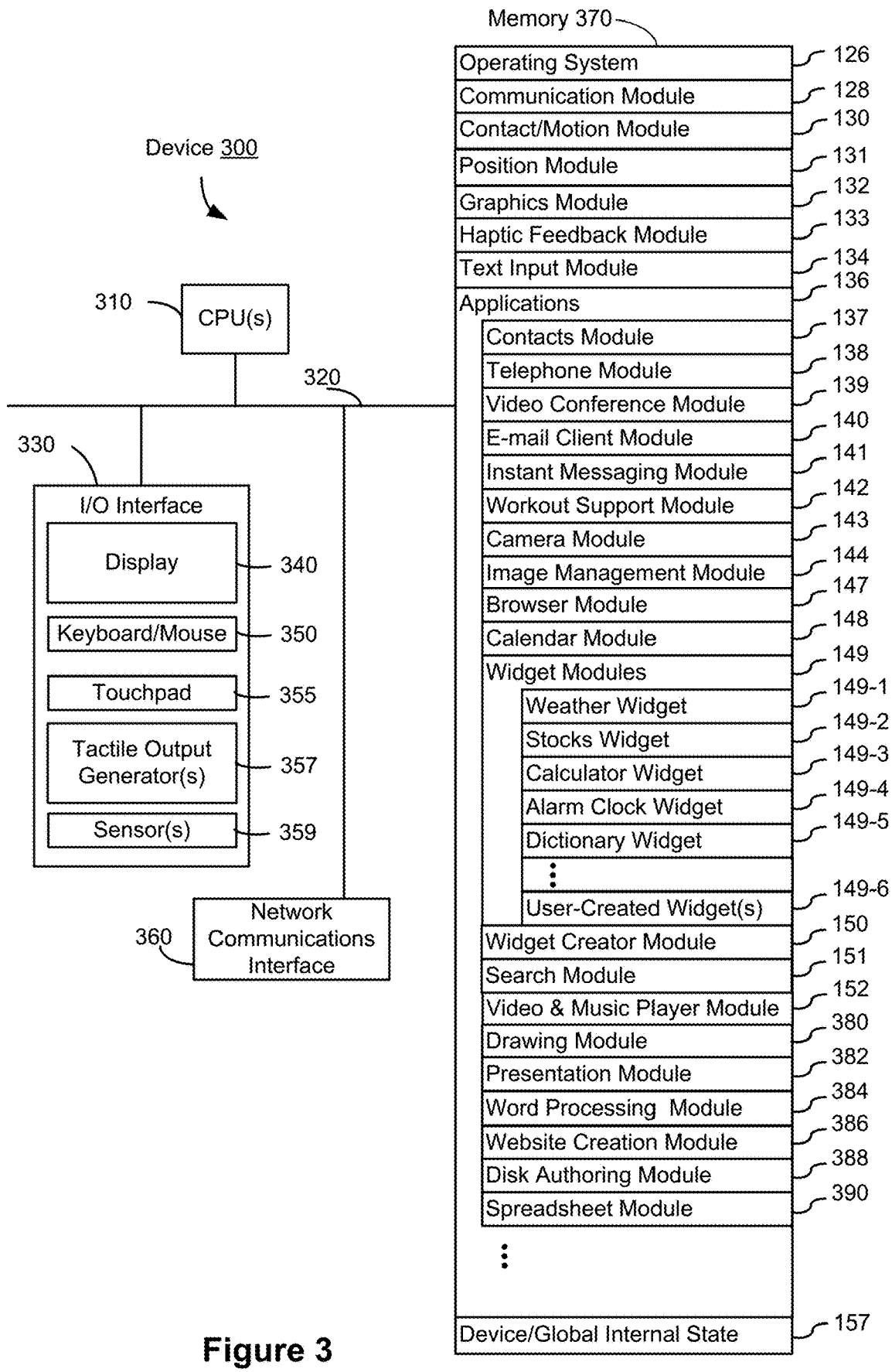
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 reminders module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or
 online video module 155.

Examples of other applications 136 that are, optionally, stored in memory 102 include other word processing applications, other image editing applications, drawing applications, presentation applications, JAVA-enabled applications, encryption, digital rights management, voice recognition, voice replication, meeting information, location sharing, document reader (e.g., book reader), and/or accessory control (e.g., home accessory control).

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed.

As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, and GPS module 135, reminders module 142 includes executable instructions to set reminders.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
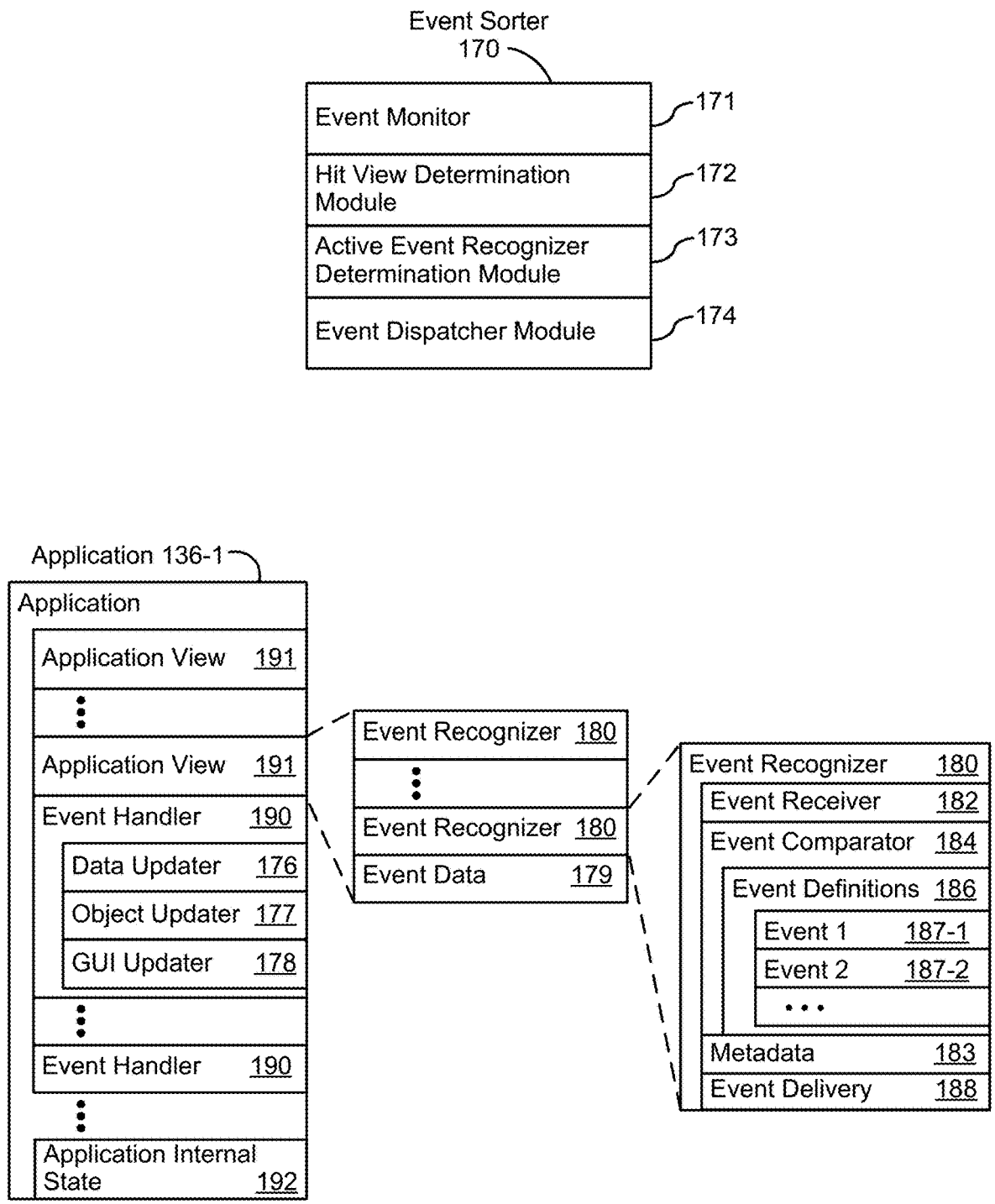
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
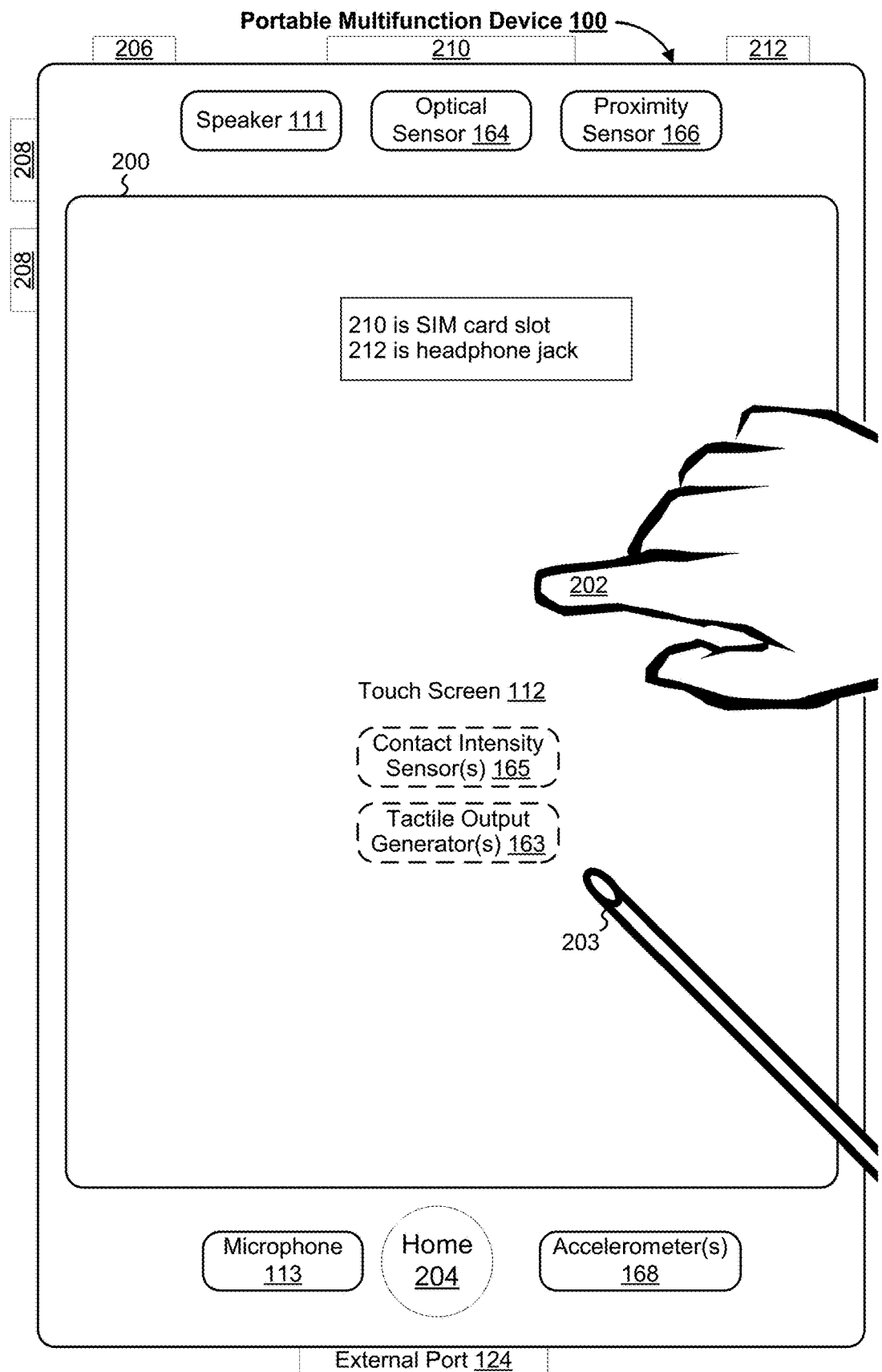
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
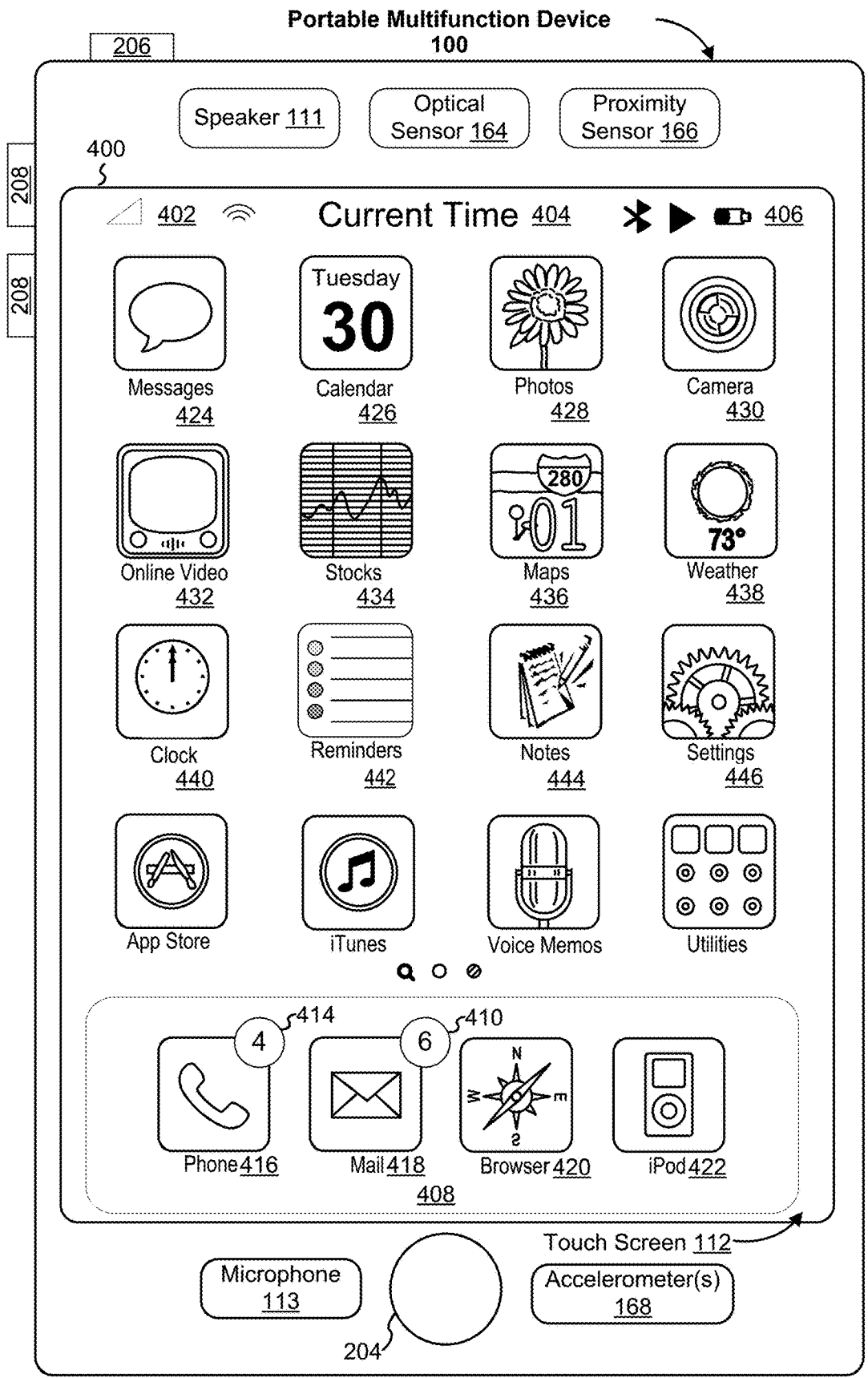
FIG. 4A illustrates an example user interface for a menu of applications on a portable multifunction device in accordance with some embodiments.
Figure 5A:
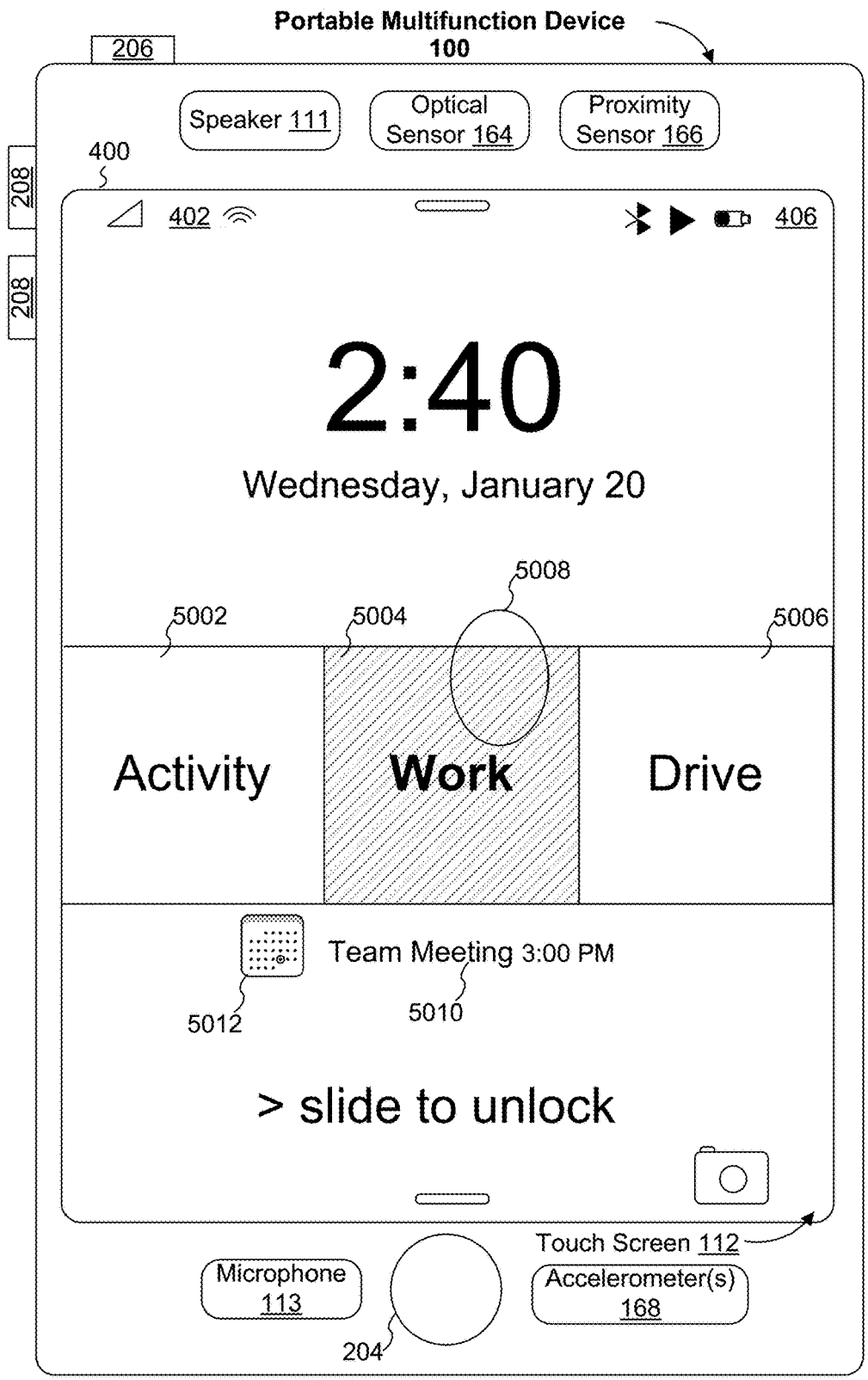
FIGS. 5A-5U illustrate example user interfaces for selecting and interacting with device modes in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for reminders module 142, labeled "Reminders;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely example. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
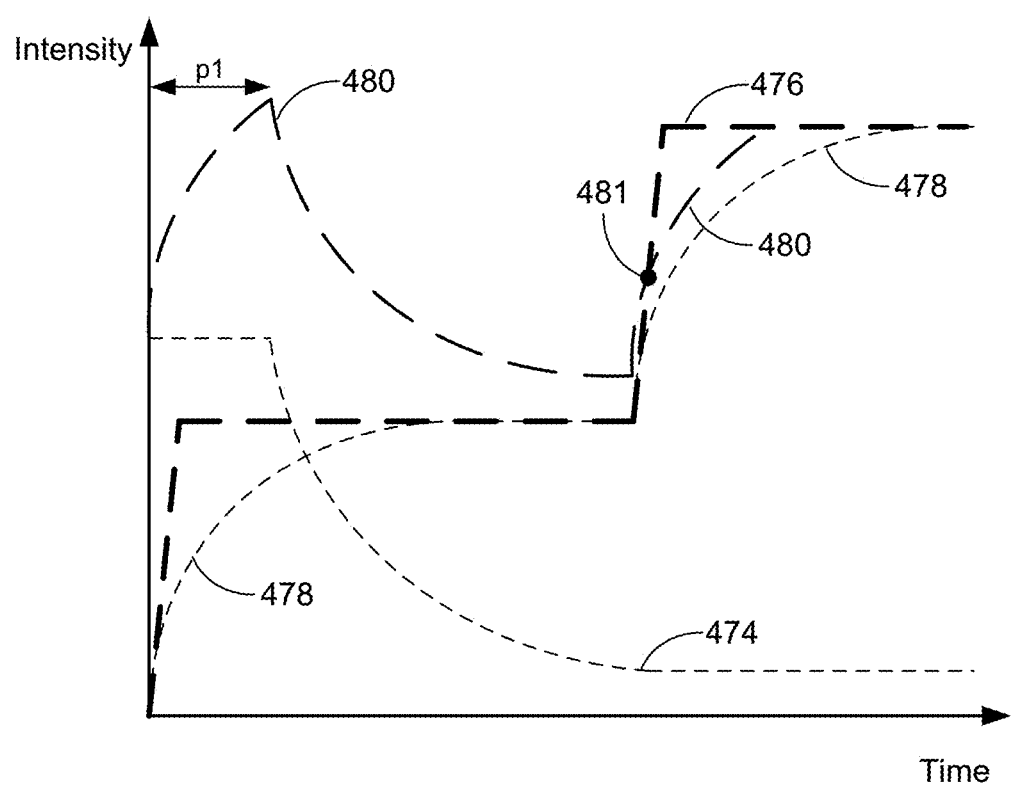
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
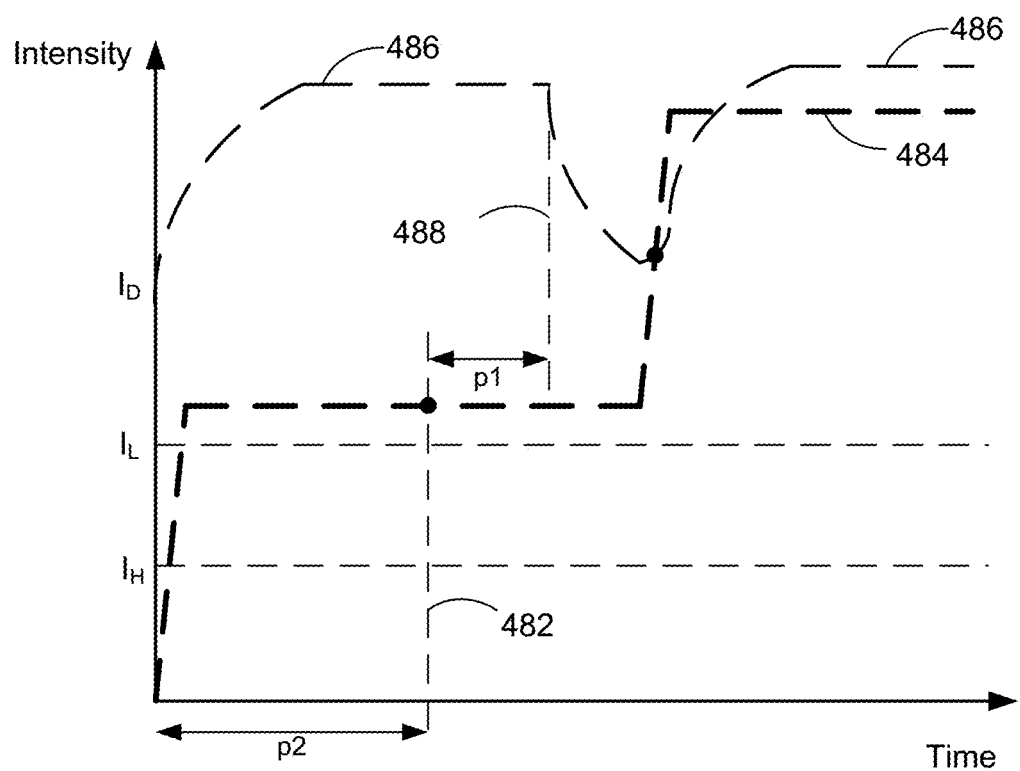

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
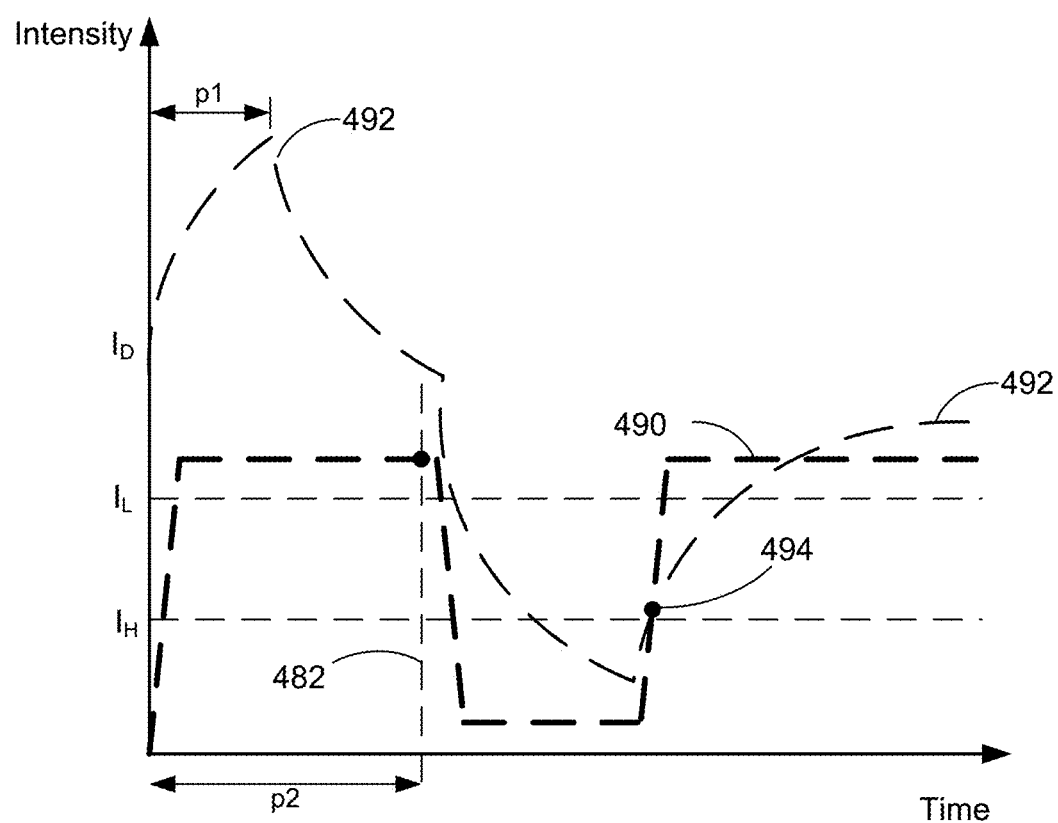

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device with a display, such as portable multifunction device 100 or device 300.

FIGS. 5A-5U illustrate example user interfaces for selecting and interacting with device modes in accordance with some embodiments. The user interfaces in these figures are used to illustrate the processes described below, including the processes in FIGS. 6A-6C and 7A-7B. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In some embodiments, the device detects inputs provided by a pointing device or other input device.

FIG. 5A illustrates mode affordances 5002, 5004, 5006 corresponding to an activity mode, a work mode, and a drive mode, respectively, of the device in accordance with some embodiments. Mode affordances 5002, 5004, 5006 are shown on a lock screen of the device. The device becomes locked, e.g., in response to user input (such as a user input received at one or more physical buttons, such as push button 206) and/or when the device has been idle for a predetermined amount of time. In some embodiments, when the device is locked, a set of device features (e.g., a set of applications and/or content) is inaccessible. In some embodiments, the device shown in FIG. 5A is locked and in a sleep state. The device enters a sleep state, e.g., in response to user input received at push button 206 received while the device is awake to instruct the device to sleep and/or when the device has been idle for a predetermined amount of time. A lock screen is displayed, e.g., when the device enters a locked state and/or when the device is awakened while in a locked state. The device is awakened, for example, in response to received user input (e.g., input received at one or more physical buttons, such as push button 206 and/or menu button 204).

In some embodiments, in response to receiving input to unlock and/or awaken the device (and/or in response to receiving other input that results in a lock screen being displayed), the device determines a mode of the device, such as a mode of the device that is currently active and/or a mode of the device that is recommended for activation. Determining a mode of the device includes, e.g., determining that time and/or device location criteria for the mode are met. For example, the device determines whether a current time (e.g., 2:40 PM) meets time criteria for the work mode. Time criteria for the work mode include, e.g., one or more time ranges indicating when the device user is typically at work, such as the time range 9:00 AM-1:30 and 2:30-6:00 PM. In accordance with a determination that the current time falls within the time range, the device determines that the work mode is a mode of the device that is recommended for activation. In some embodiments (e.g., when time and/or device location criteria for multiple modes are met), multiple modes are concurrently recommended.

In some embodiments, the device displays a visual indication that corresponds to a recommendation to activate a mode of the device. For example, an area corresponding to mode affordance 5004 is shaded to indicate that the work mode is the recommended mode for activation and/or to visually distinguish mode affordance 5004 from mode affordances 5002 and 5006. The text of mode affordance 5004 is bolded to indicate that the work mode is the recommended mode for activation and/or to visually distinguish text associated with mode affordance 5004 from text associated with mode affordances 5002 and 5006.

In some embodiments, the device displays information associated with a mode of the device that is recommended for activation. The information includes, e.g., one or more information items such as notifications (including, e.g., calendar appointment information, reminder information, e-mail information, telephone call information, message information, stock information, activity information, and/or navigation information, such as currently predicted drive time), content items, content item metadata, application data, and/or graphical items (e.g., icons) indicating a source of the information. The information includes, e.g., one or more information items having a highest priority among the information items of the mode (e.g., determined in accordance with automatic weighting or in accordance with user preference information). For example, information associated with a work mode includes calendar appointment notification 5010. In some embodiments, calendar appointment notification 5010 includes calendar icon 5012. In some embodiments, the information associated with the work mode is displayed at a location corresponding to mode affordance 5004, e.g., a location proximate to mode affordance 5004.

In some embodiments, to activate the recommended mode, a user provides input at a location corresponding to the recommended mode affordance. For example, recommended mode 5004 is activated in response to user input such as a gesture (e.g., a finger tap gesture) detected while a focus selector 5008 is at a location corresponding to the recommended mode affordance 5004.

Figure 5B:
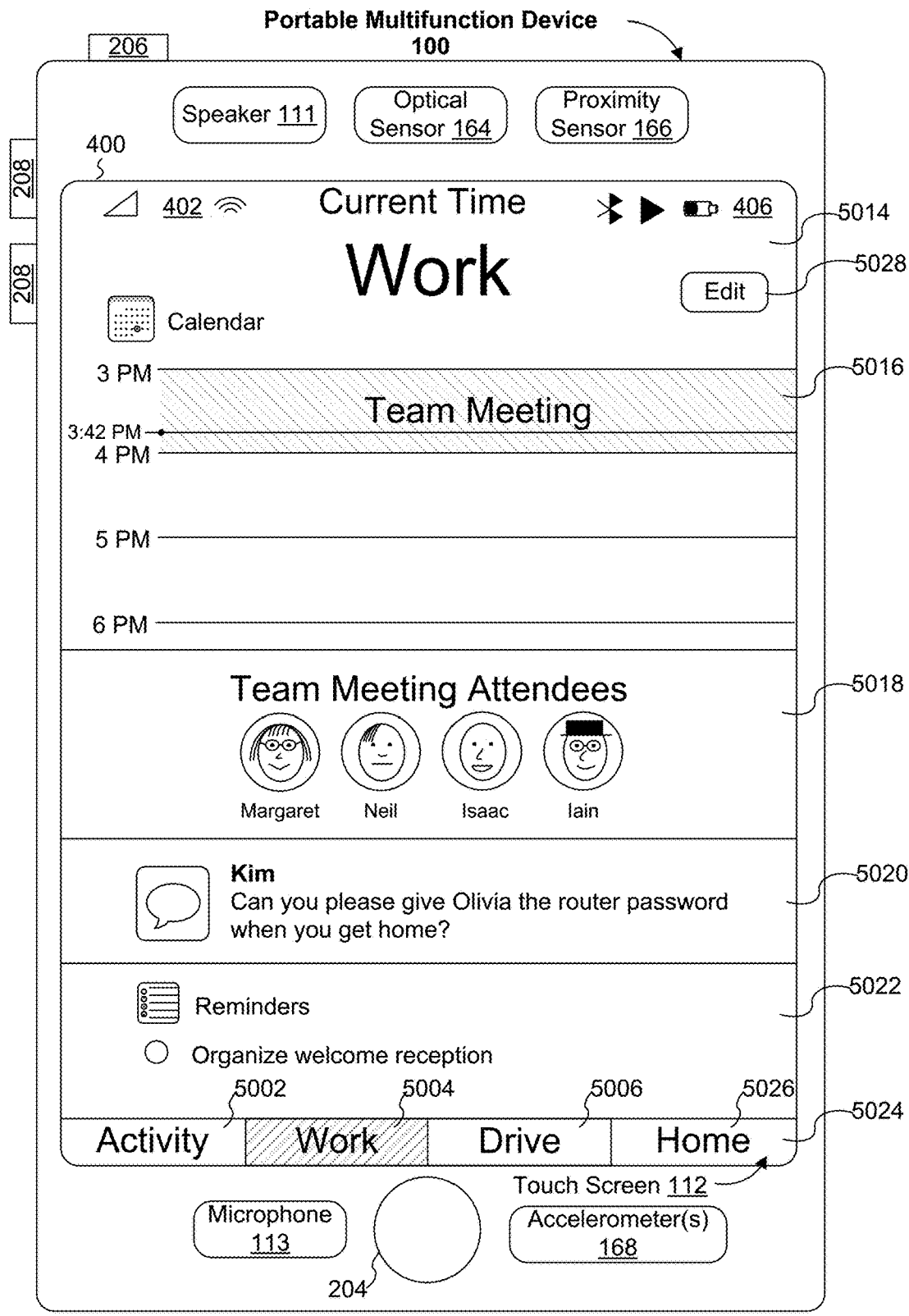

FIG. 5B illustrates work mode interface 5014, in accordance with some embodiments. In some embodiments, work mode interface 5014 is displayed in accordance with activation of mode affordance 5004. In some embodiments, a mode interface (such as work mode interface 5014) displays a plurality of information items associated with a mode. For example, work mode interface includes a view 5016 of data from a calendar application, meeting information 5018, a notification 5020 from a messaging application, and a notification 5022 from a reminders application. In some embodiments, in response to user input such as a gesture (e.g., a finger tap gesture) detected while a focus selector is at a location of an information item, additional information corresponding to the information item is displayed, an application corresponding to the information item is activated, and/or an interface for an application corresponding to the information item is displayed. For example, in some embodiments, in response to user input at a location corresponding to notification 5020 from the messaging application, the device activates a messaging application and/or displays a messaging application interface. In some embodiments, additional information items associated with a mode interface are revealed in response to user input such as a gesture (e.g., a drag gesture that drags work mode interface 5014, e.g., in a vertical direction, to reveal additional mode interface information items below and/or above the information items currently displayed). In some embodiments, work mode interface 5014 includes a mode affordance chrome 5024 including, e.g., activity mode affordance 5002, work mode affordance 5004, drive mode affordance 5006, and/or home mode affordance 5026. In some embodiments, work mode interface 5014 includes a mode settings affordance 5028.

In some embodiments, a mode interface (e.g., work mode interface 5014) includes information items in addition to a set of currently displayed information items. The additional information items are displayed, e.g., in response to user input (e.g., a vertical drag gesture to reveal information items below or above currently displayed information items and/or a horizontal drag gesture to reveal additional information items to the left or right of currently displayed information items).

Figure 5C:
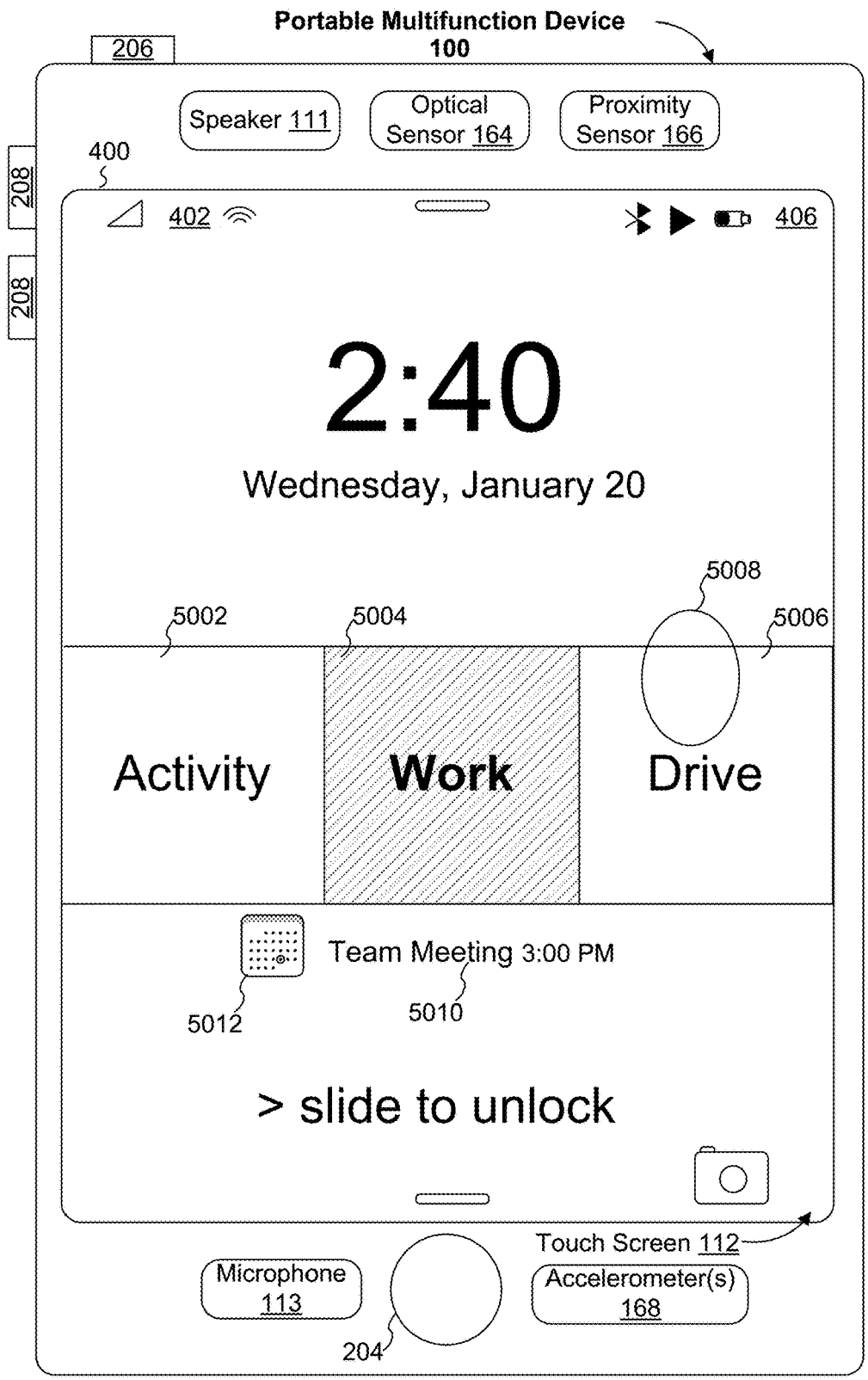

FIG. 5C illustrates activation of a mode that is not the recommended mode, in accordance with some embodiments. For example, a drive mode corresponding to drive mode affordance 5006 is activated (while the drive mode is not the recommended mode, as indicated by the lack of visually distinguishing features applied to drive mode affordance 5006) in response to a user input such as a gesture (e.g., a finger tap gesture) provided while a focus selector 5008 is at a location corresponding to the drive mode affordance 5006.

Figure 5D:
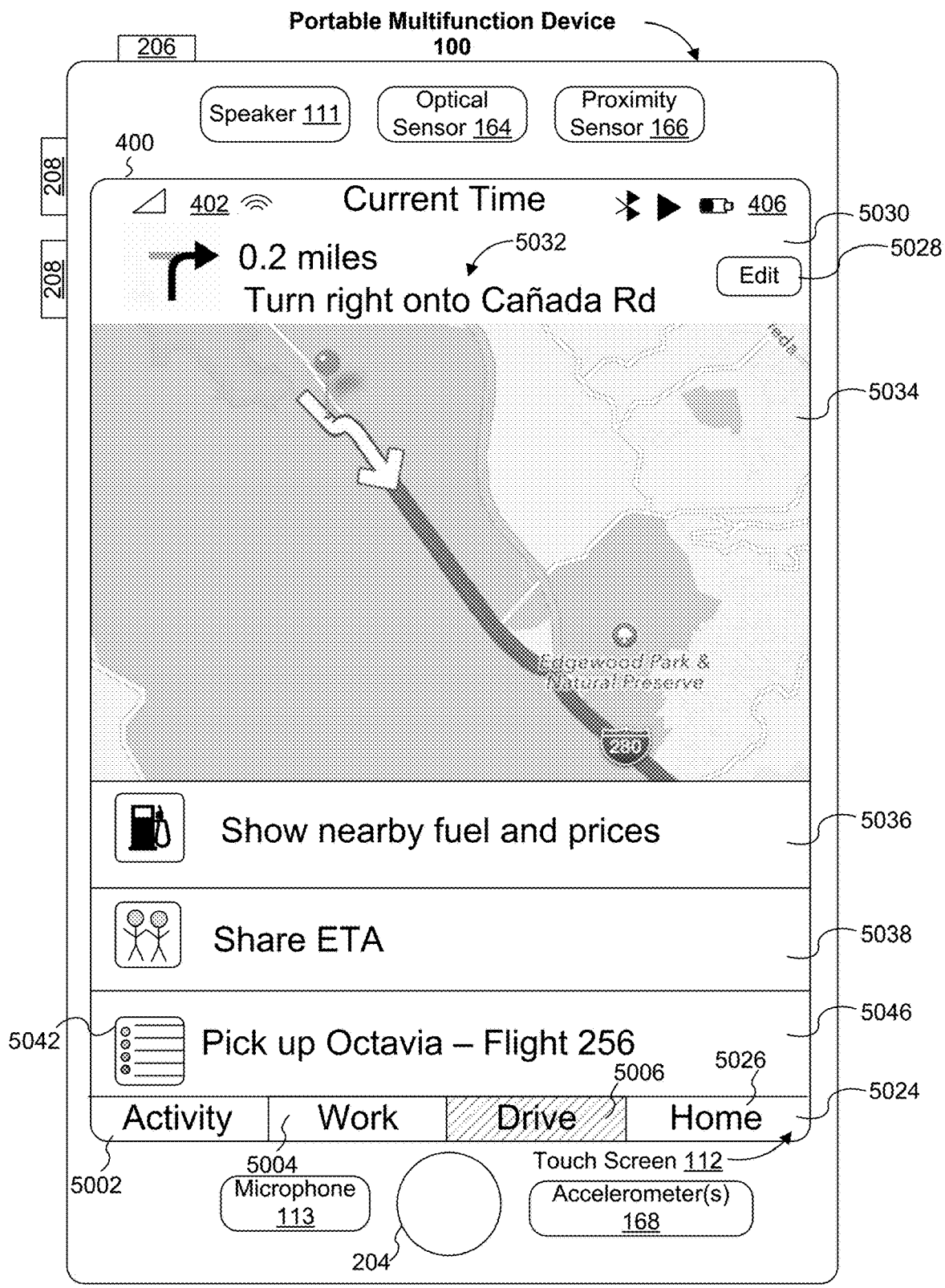

FIG. 5D illustrates drive mode interface 5030, in accordance with some embodiments. In some embodiments, drive mode interface 5030 is displayed in accordance with activation of drive mode affordance 5006. In some embodiments, drive mode interface 5030 includes data from a map application (e.g., navigation instructions 5032, map 5034, and/or place information affordance 5036), a Share ETA affordance 5038 for sharing (e.g., with one or more preconfigured contacts of the user) an estimated time of arrival ("ETA"), and/or notification 5046 from a reminders application. In some embodiments, a user shares a current location (e.g., with one or more preconfigured contacts of the user) in lieu of and/or in addition to an ETA. In some embodiments, drive mode interface 5014 includes a mode settings affordance 5028.

In some embodiments, one or more information items of a mode interface are constrained to have a minimum area and/or minimum font size. Larger interface features are provided to improve safety when drive mode interface 5030 is active and/or when the device determines that it is located in a moving vehicle. For example, the font size of navigation instructions 5032, place information affordance 5036, and notification 5046 of drive mode interface 5030 is larger than font sizes used in other mode interfaces such as work mode interface 5014. The area of icons shown in drive mode interface 5030, such as reminders icon 5042, is larger than the area of icons shown in work mode interface 5014, such as reminders icon 5044. In some embodiments, one or more information items (and/or types of information items) are not shown (e.g., not permitted to be shown) when drive mode interface 5030 is active and/or when the device determines that it is located in a moving vehicle. For example, in some embodiments, mode settings affordance 5028 ceases to be shown when the device determines that a vehicle in which the device is located is moving.

In some embodiments, different mode interfaces are configured to display different information originating from the same application. For example, when a reminder application includes reminder 5022 and reminder 5046, reminder 5046 is displayed in drive mode interface 5030 but not in work mode interface 5014, and reminder 5022 is displayed in work mode interface 5014 but not in drive mode interface 5030. A further description of configuring a mode interface to display or to not display a category of reminders is provided below with reference to FIG. 5J.

Figure 5E:
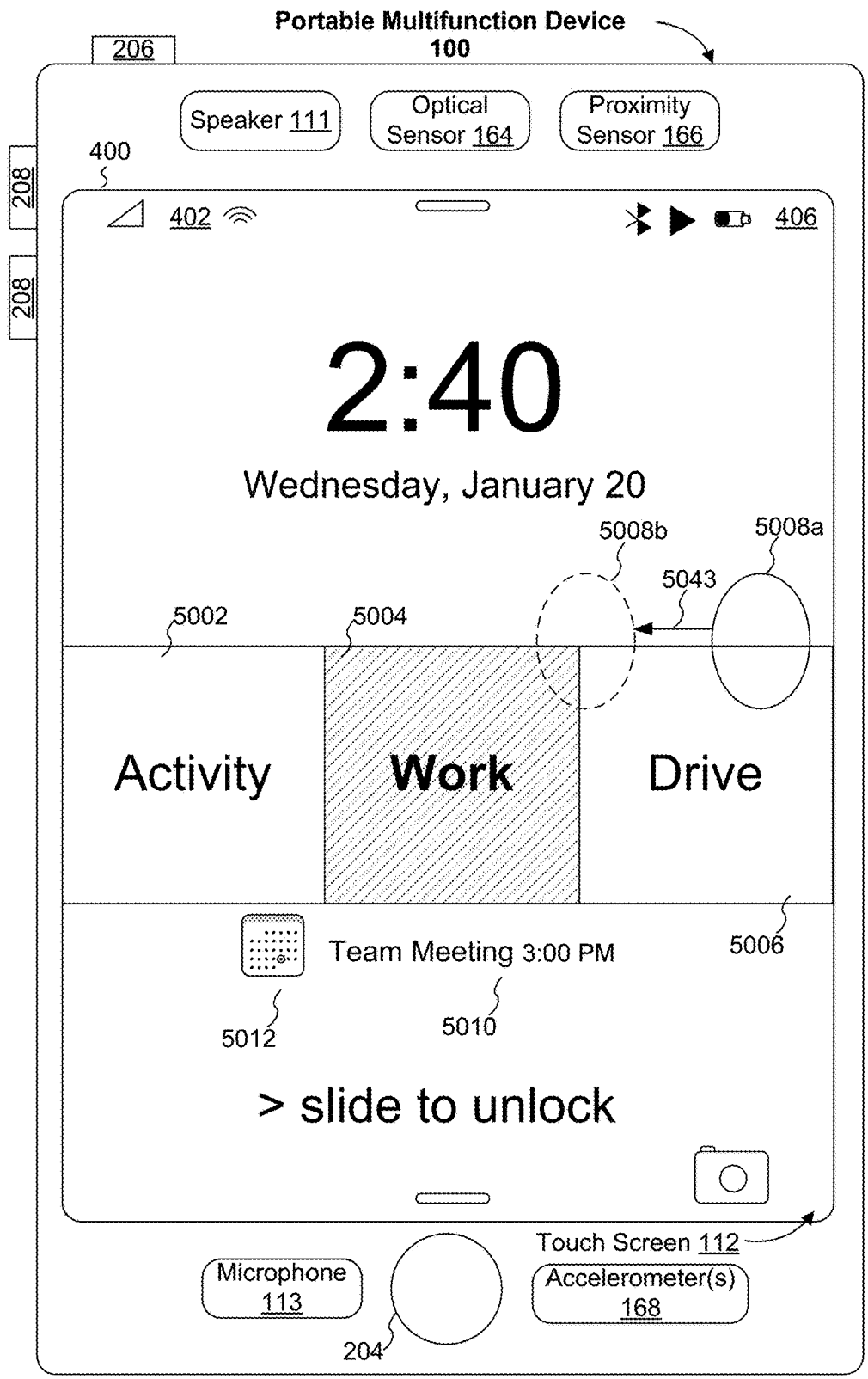
Figure 5F:
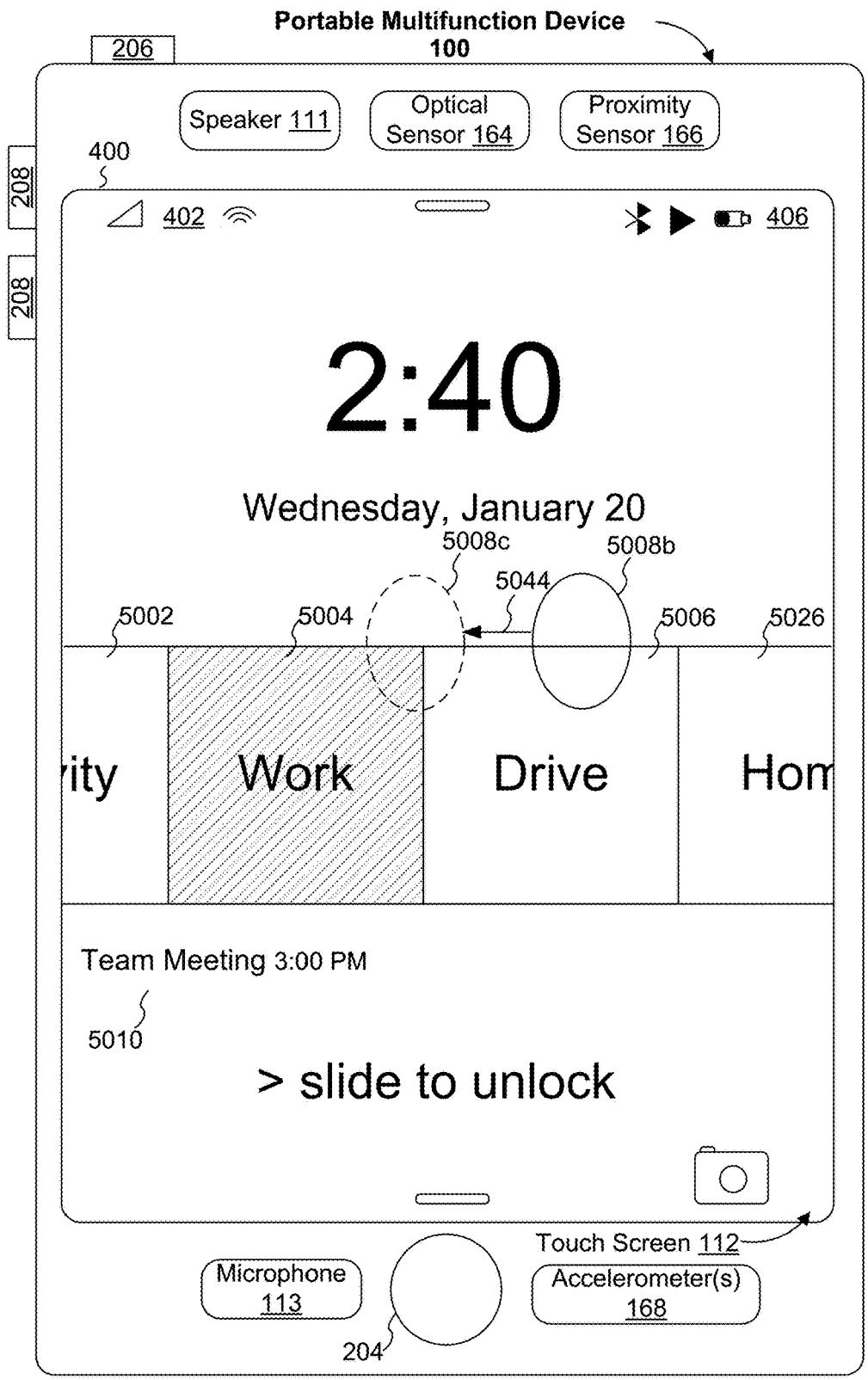
Figure 5G:
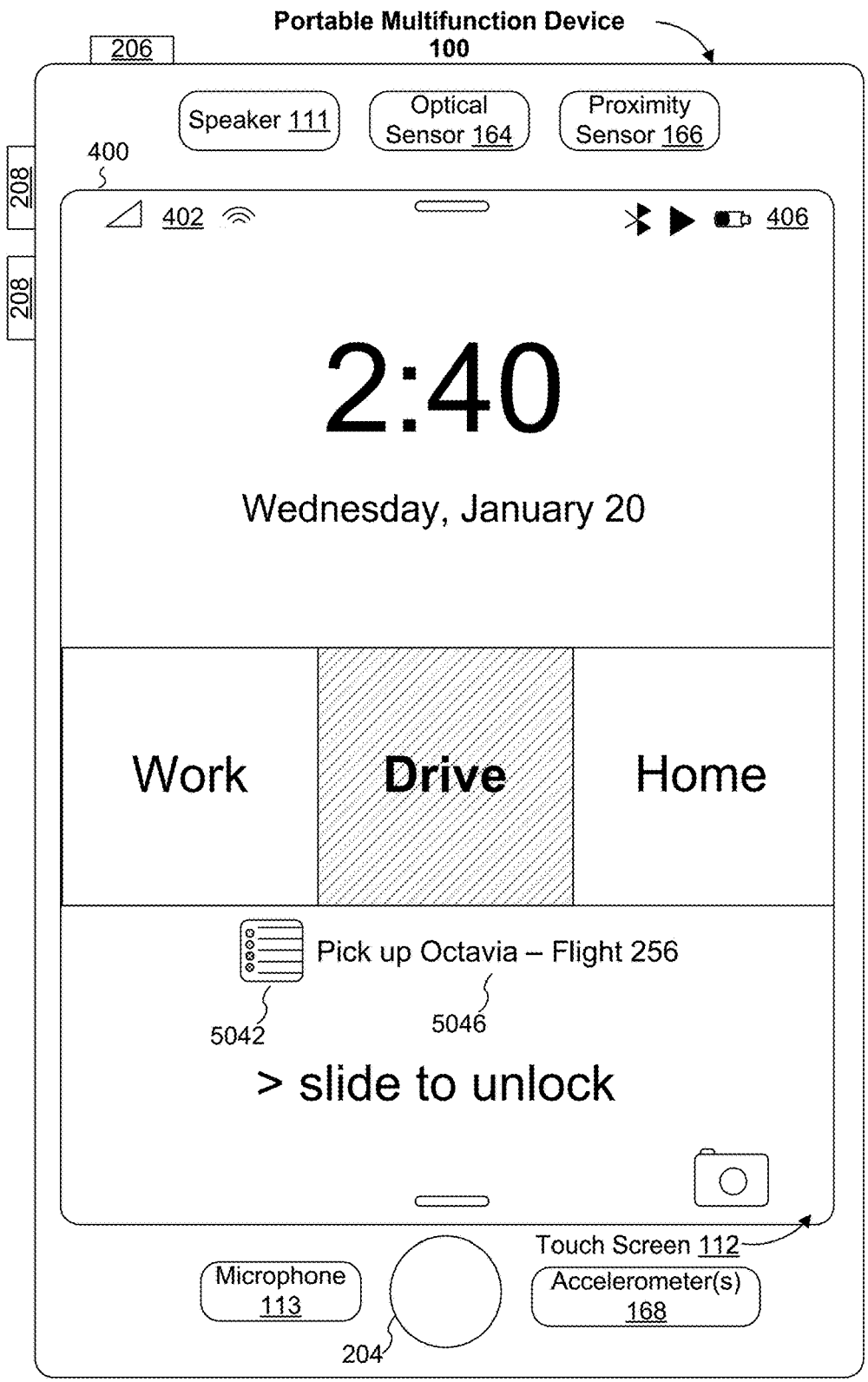

FIGS. 5E-5G illustrate a gesture on a lock screen used to activate a mode that is not a recommended mode, in accordance with some embodiments. In FIG. 5E, a work mode corresponding to mode affordance 5004 is recommended for activation, e.g., as indicated by the visually distinguishing features of mode affordance 5004 (such as the shading and bold text of mode affordance 5004). In some embodiments, in response to user input, such as a horizontal drag gesture, the mode affordances are scrolled relative to the displayed lock screen (e.g., to adjust and/or reveal one or more modes of the device). For example, the device detects a gesture (e.g., a drag gesture) as focus selector 5008 moves from a first position 5008a to a second position 5008b along a path indicated by arrow 5043, as shown in FIG. 5E, and from the second position 5008b to a third position 5008c along a path indicated by arrow 5044, as shown in FIG. 5F. FIG. 5F illustrates an intermediate state of lock screen as a drag gesture is received. In FIG. 5F, mode affordances 5002, 5004, 5006 have shifted to the left, such that mode affordance 5002 has partially "slid off" of the left edge of display 400 and mode affordance 5026 is partially revealed at the right edge of display 400. As mode affordance 5004 shifts to the left, calendar appointment notification 5010 corresponding to mode affordance 5004 also shifts to the left.

In FIG. 5G, in response to receiving the user input including the drag gesture, drive mode affordance 5006 is shown in a position corresponding to the final focus selector position 5008c of the drag gesture. In some embodiments, in response to determining that user input to change a position of a mode affordance has moved the mode affordance beyond a threshold distance, the device centers the mode affordance (e.g., relative to the lock screen). In some embodiments, user input moving drive mode affordance 5006 to a position that is at or near the center of display 400 selects the drive mode as the active mode of the device. In some embodiments, in response to detecting the gesture, the device displays information associated with a drive mode, e.g., reminder notification 5046 and/or reminder icon 5042. In some embodiments, when the drive mode is active, one or more settings associated with the drive mode take effect. In some embodiments, in response to receiving a user input while a focus selector is at a location corresponding to mode affordance 5006, such as a tap gesture at mode affordance 5006, the device displays a drive mode interface (e.g., drive mode interface 5030 as described with regard to FIG. 5D).

Figure 5H:
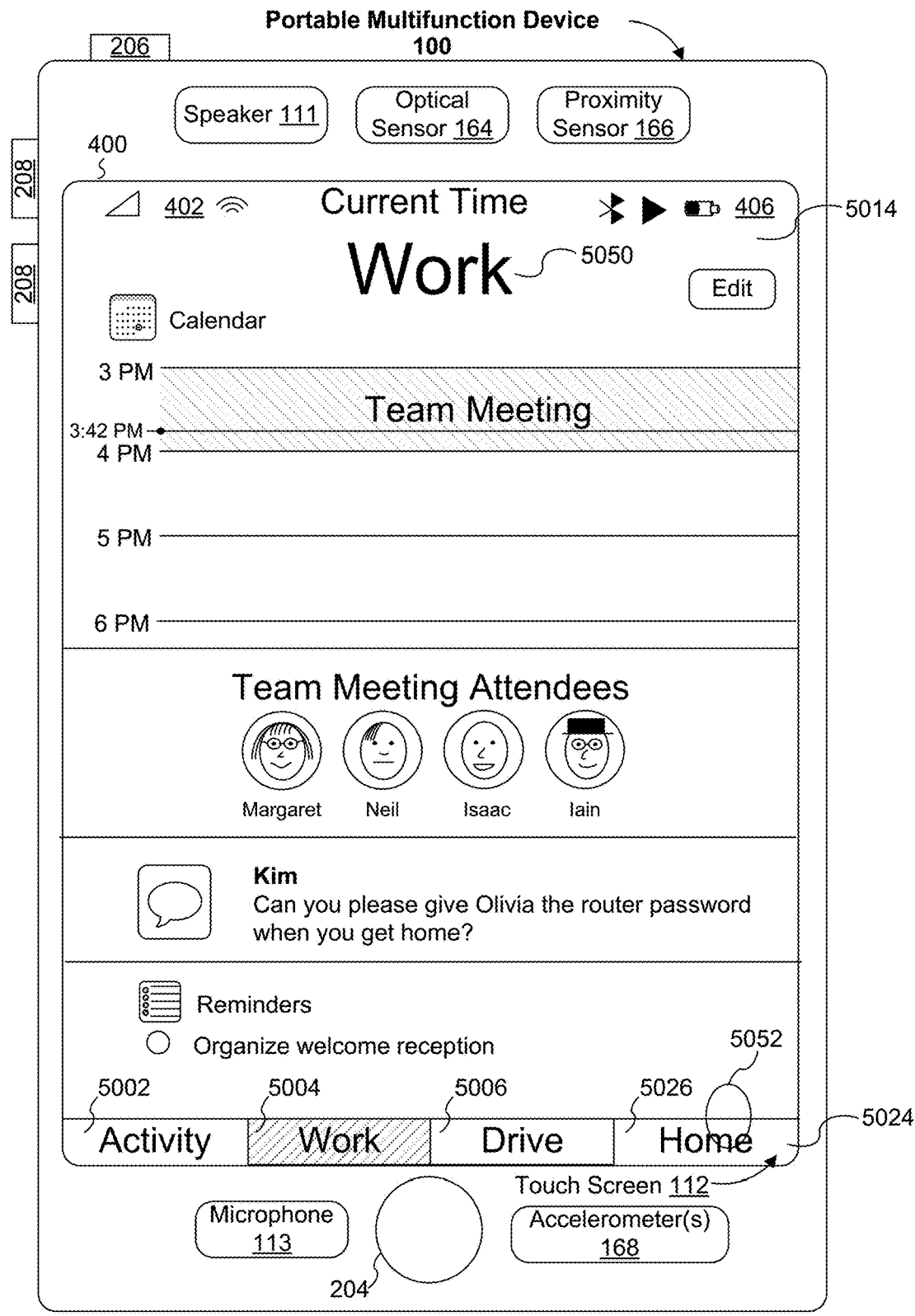
Figure 5I:
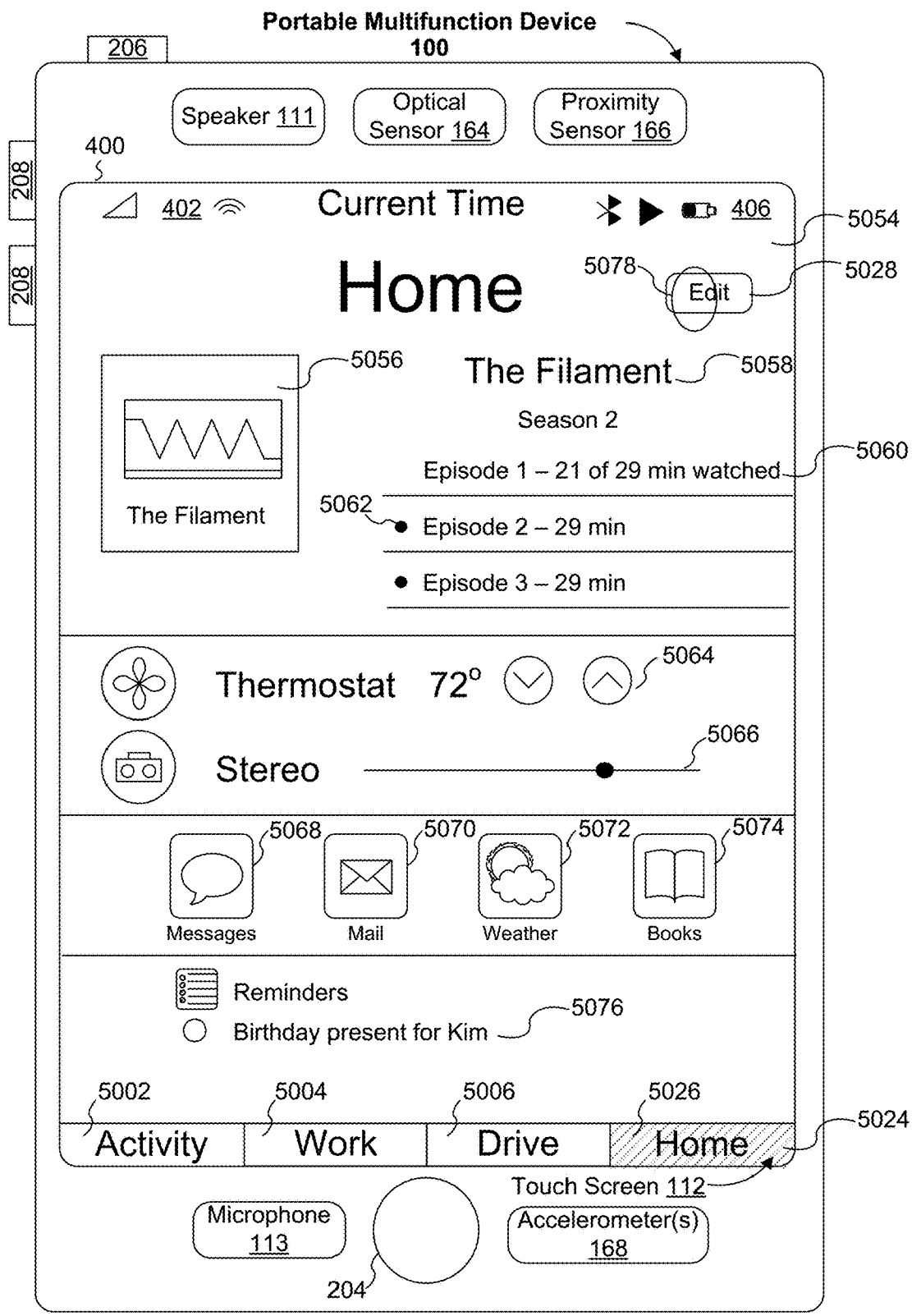

FIG. 5H illustrates overriding an active mode of a device, in accordance with some embodiments. In FIG. 5H, a work mode is an active mode of the device, as indicated in work mode interface 5014 (e.g., by the title "Work" as shown at 5050 and the visually distinguishing features, such as the shading, of work mode affordance 5004 in mode affordance chrome 5024). In some embodiments, in response to user input such as a gesture (e.g., a tap gesture) detected while a focus selector 5052 is at a location of a mode affordance for a mode other than the work mode affordance 5004 (e.g., while the focus selector 5052 is at home mode affordance 5026), the selected mode (e.g., the home mode) overrides the work mode. When the home mode overrides the work mode, the home mode is activated and, in some embodiments, home mode interface 5054 is displayed as shown in FIG. 5I. In some embodiments, activating the home mode allows a user to perform an operation in the home mode, such as making changes to the interface and/or settings of the home mode. In some embodiments, activating the home mode causes one or more settings of the home mode to take effect.

FIG. 5I illustrates home mode interface 5054, in accordance with some embodiments. In some embodiments, home mode interface 5054 is displayed in response to user input received at a location corresponding to home mode affordance 5026. In some embodiments, home mode interface 5054 includes information items for a video viewer application (e.g., content thumbnail image 5056, content identification information 5058, and/or content episode/chapter information 5060). The content episode/chapter information 5060 includes, e.g., information indicating unwatched episodes (e.g., dot 5062 indicates that an episode is unwatched) and/or information indicating progress in an episode that has been partially watched (e.g., "21 of 29 minutes watched, as indicated at 5060). Content episode/chapter information 5060 is, e.g., information associated with recently viewed content (such as recently viewed content while the home mode was previously active on the device). In this way, when the home mode is activated, a user is provided with a convenient interface for resuming playback of recently played content. In some embodiments, information items of home mode interface 5054 include one or more control affordances 5064, 5066 for controlling devices communicatively connected to the device (e.g., widgets for controlling devices in a home automation system, such as HomeKit™ from Apple Inc. of Cupertino, Calif.). In some embodiments, information items of home mode interface 554 include one or more application icons 5068, 5070, 5072, 5074, e.g., for applications that are frequently used while the home mode is active. In some embodiments, information items of home mode interface 5054 include a notification 5076 from a reminders application.

In some embodiments, in response to user input such as a gesture (e.g., a tap gesture) detected while a focus selector 5078 is at a location of a mode settings affordance 5028, a mode settings interface 5080 is displayed.

Figure 5J:
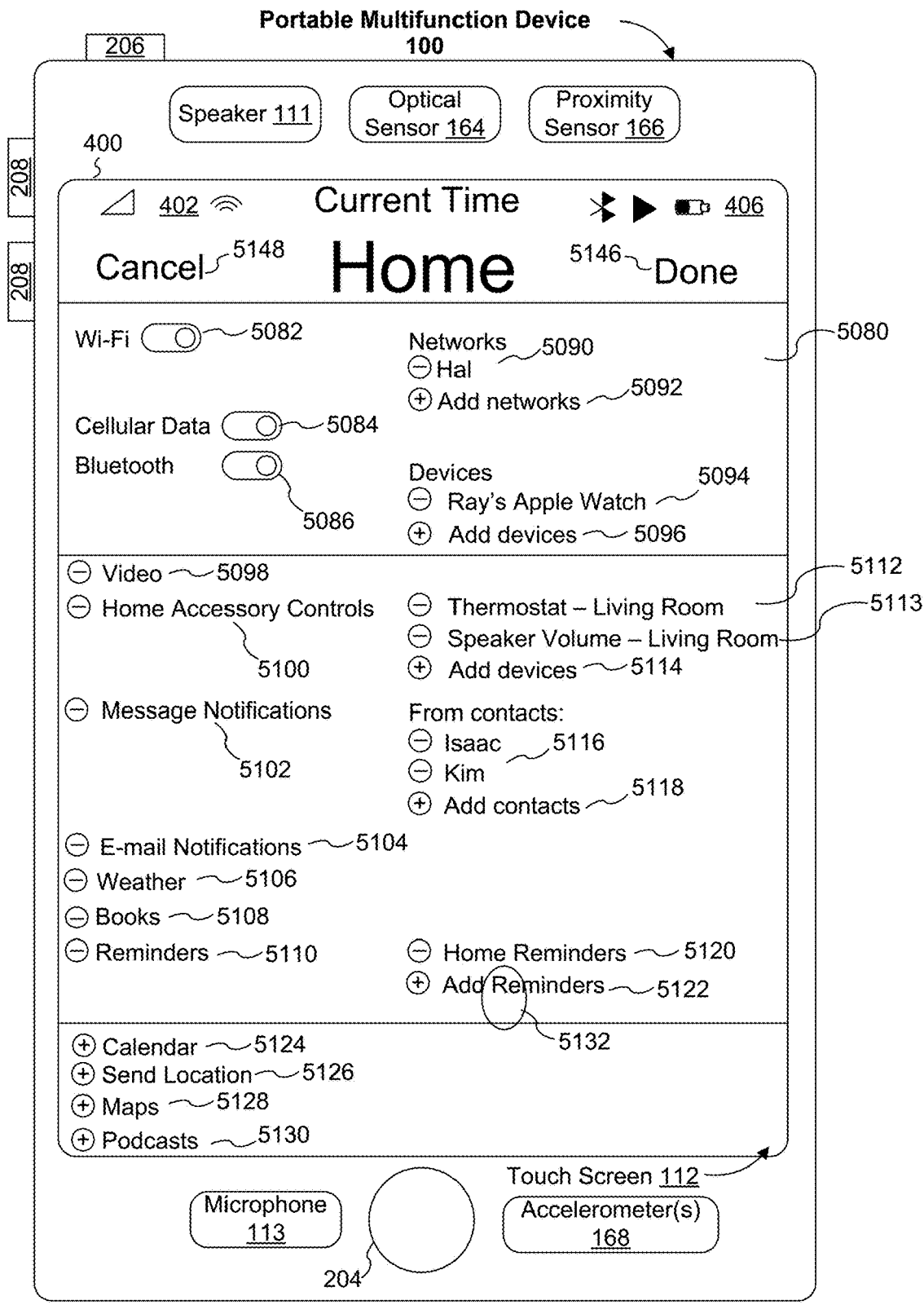

FIG. 5J illustrates a mode settings interface 5080, in accordance with some embodiments. In some embodiments, mode settings interface 5080 is an interface for adding, removing, and/or modifying information items and/or settings of one or more modes.

In some embodiments, mode settings interface 5080 includes one or more affordances for adjusting network settings (e.g., affordances 5082, 5084, 5086 for enabling and disabling Wi-Fi, Cellular Data, and/or Bluetooth, respectively; affordance 5090 for removing a currently added Wi-Fi network, affordance 5092 for adding one or more Wi-Fi Networks, affordance 5094 for removing a currently added accessory that connects to the device via Bluetooth, and/or affordance 5096 for adding one or more accessories to connect to the device via Bluetooth).

In some embodiments, mode settings interface 5080 includes one or more affordances for adding, modifying, and/or removing application information items. For example, affordance 5098 corresponds to information items 5056, 5058, 5060 and/or 5062 for a video viewer application. In some embodiments, in response to a user input received while a focus selector is at a location corresponding to affordance 5098, information items 5056, 5058, 5060 and 5062 for a video viewer application are removed from home mode interface 5054.

In some embodiments, mode settings interface 5080 includes affordance 5100 that corresponds to home accessory control. For example, to remove a home accessory control region from home mode interface 5054, a user provides input at a location corresponding to affordance 5100. To remove individual controls 5064 or 5066 for controlling home accessory devices, user input is provided at a location corresponding to affordances 5112 or 5113, respectively. To add controls for home accessory devices, user input is provided at a location corresponding to affordance 5114.

Affordances 5102, 5104, 5106, and 5108 are usable to remove application icons 5068, 5070, 5072, and 5074, respectively from home mode interface 5054. For example, to remove weather application icon 5072 from home mode interface 5054, a user provides user input while a focus selector is at weather application removal affordance 5104. Affordance 5110 is usable to remove reminder notification area 5076 from home mode interface 5054. To remove reminders from home mode interface 5054, a user provides user input while a focus selector is at a location that corresponds to reminders removal affordance 5114.

In some embodiments, a mode is configurable to display communications and/or communication notifications from a filtered set of contacts. For example, a user may wish to avoid displaying e-mail from work contacts while the user is at home (e.g., when the home mode is active). In another example, a user wishes to avoid displaying message notifications from personal contacts while the user is at work (e.g., when the work mode is active). In some embodiments, mode settings interface 5080 includes one or more affordances 5116 for removing contacts (and/or groups of contacts) from which messages and/or message notifications are to be displayed while the home mode is active. In some embodiments, mode settings interface 5080 includes an affordance 5118 for adding contacts (and/or groups of contacts) from which messages and/or message notifications are to be displayed while the home mode is active. In some embodiments, application settings such as contact settings for e-mail, phone, calendar, and/or location sharing are configurable (e.g., in mode settings interface 5080) to limit information displayed in a mode to information associated with a limited set of contacts.

In some embodiments, a mode is configurable to display reminders and/or reminder notifications from a filtered set of reminders. For example, a set of reminders are stored in a "Work Reminders" group and a different set of reminders is stored in a "Home Reminders" group. In some embodiments, mode settings interface 5080 includes one or more affordances 5120 for removing a reminder group from which reminders and/or reminder notifications are to be displayed while the home mode is active. In some embodiments, mode settings interface 5080 includes an affordance 5122 for adding a reminder group from which reminders and/or reminder notifications are displayed while the home mode is active.

In some embodiments, mode settings interface 5080 includes one or more affordances 5124, 5126, 5128, 5130 for adding application information items (e.g., application icons, application notification areas, application notifications, and/or application widgets) to home mode interface 5054. For example, to add a view of data from a calendar application to home mode interface 5054 (e.g., similar to view 5016 of data from a calendar application shown in work mode interface 5014), a user provides user input while a focus selector is at a location corresponding to affordance 5124.

In some embodiments, mode settings interface 5080 includes settings affordances in addition to a set of currently displayed settings affordances. The additional settings affordances are displayed, e.g., in response to user input. For example, in some embodiments, in response to a vertical drag gesture, the device reveals settings affordances below or above currently displayed affordances (e.g., settings affordances for the same mode as the currently displayed mode affordances). In some embodiments, in response to a horizontal drag gesture, the device reveals settings affordances to the left or right of currently displayed settings (e.g., settings for different modes).

In some embodiments, mode settings interface 5080 includes an affordance 5146 corresponding to a "Done" option to apply changes (e.g., all changes made using affordances of mode settings interface 5080 since mode settings interface 5080 was displayed). In some embodiments, mode settings interface 5080 includes an affordance 5148 corresponding to a "Cancel" option to cancel changes (e.g., all changes made using affordances of mode settings interface 5080 since mode settings interface 5080 was displayed).

In some embodiments, a mode settings interface 5080 is used to perform an operation in a mode that is not the currently active mode. For example, a user may wish to wrap up a task stored in a work reminders group after the user returns home. While the user is still at work, and the work mode is active, the user can override the work mode to activate the home mode. While the home mode is activated (and the home mode interface 5054 is displayed), the user visits the mode settings interface 5080 and adds the work reminders group to the reminders notifications for the home mode. The device returns to the work mode. Later, when the user is at home and the home mode is active, the work reminder from the work reminders group is displayed in the home mode interface 5054.

Figure 5K:
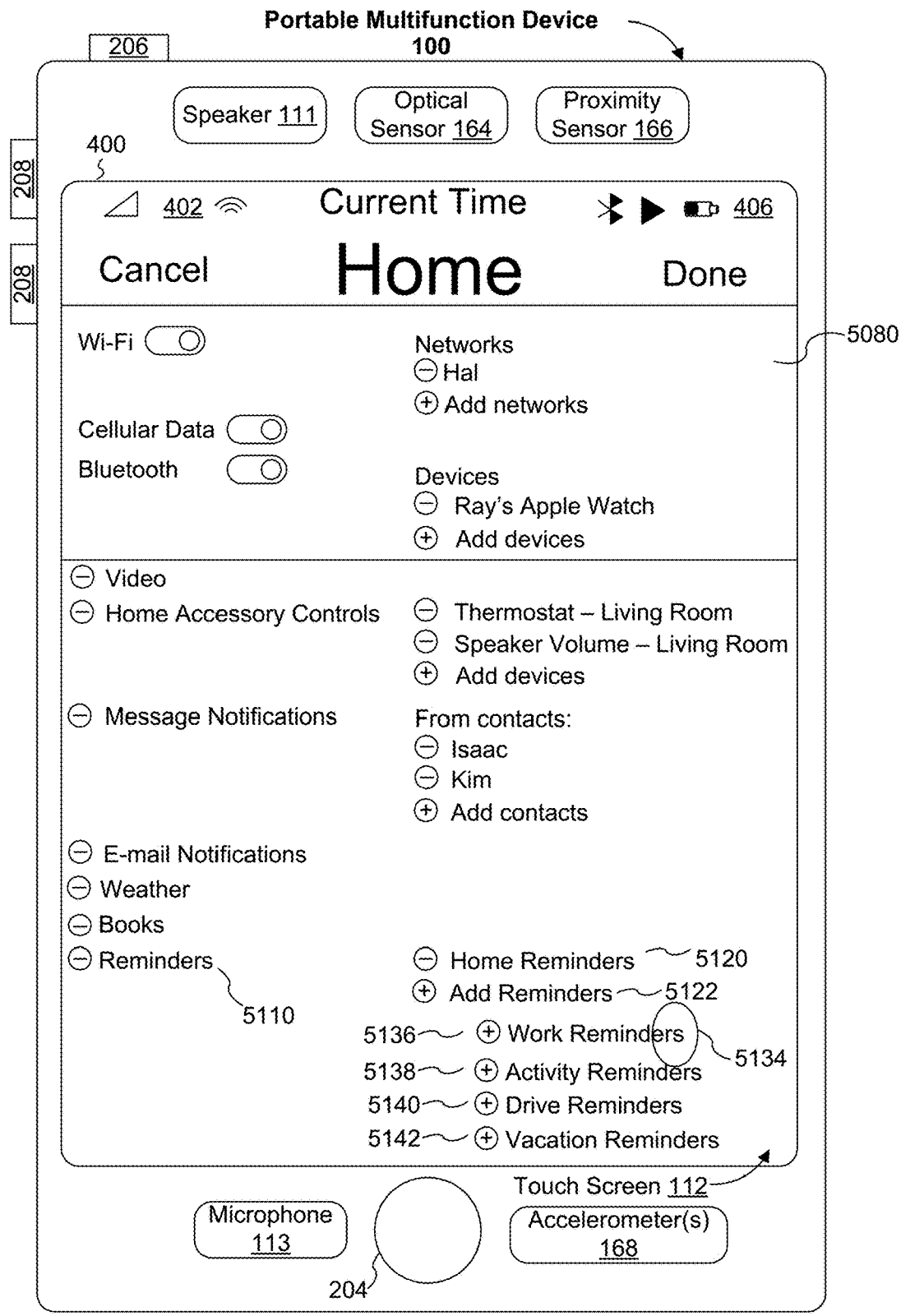
Figure 5L:
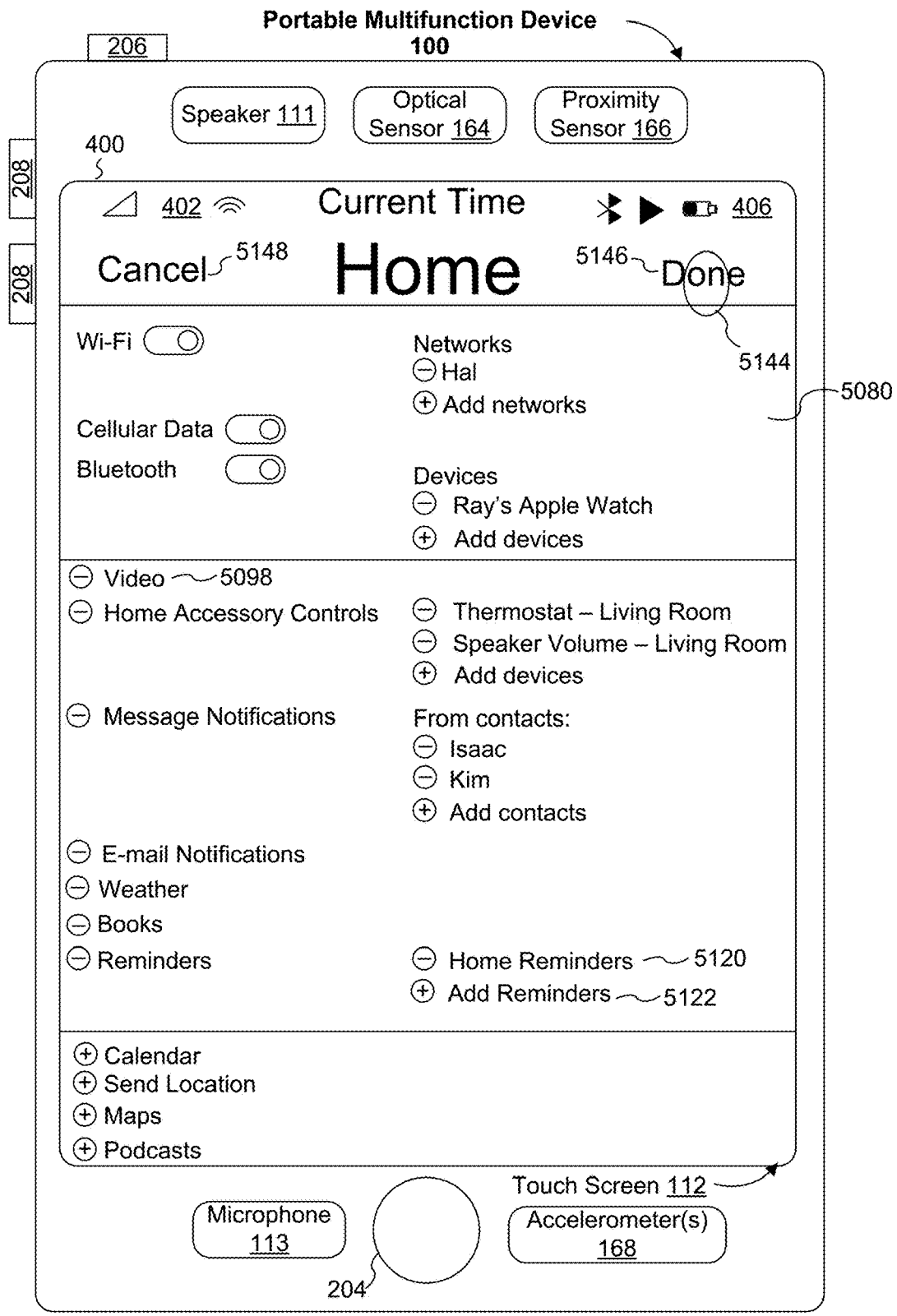
Figure 5M:
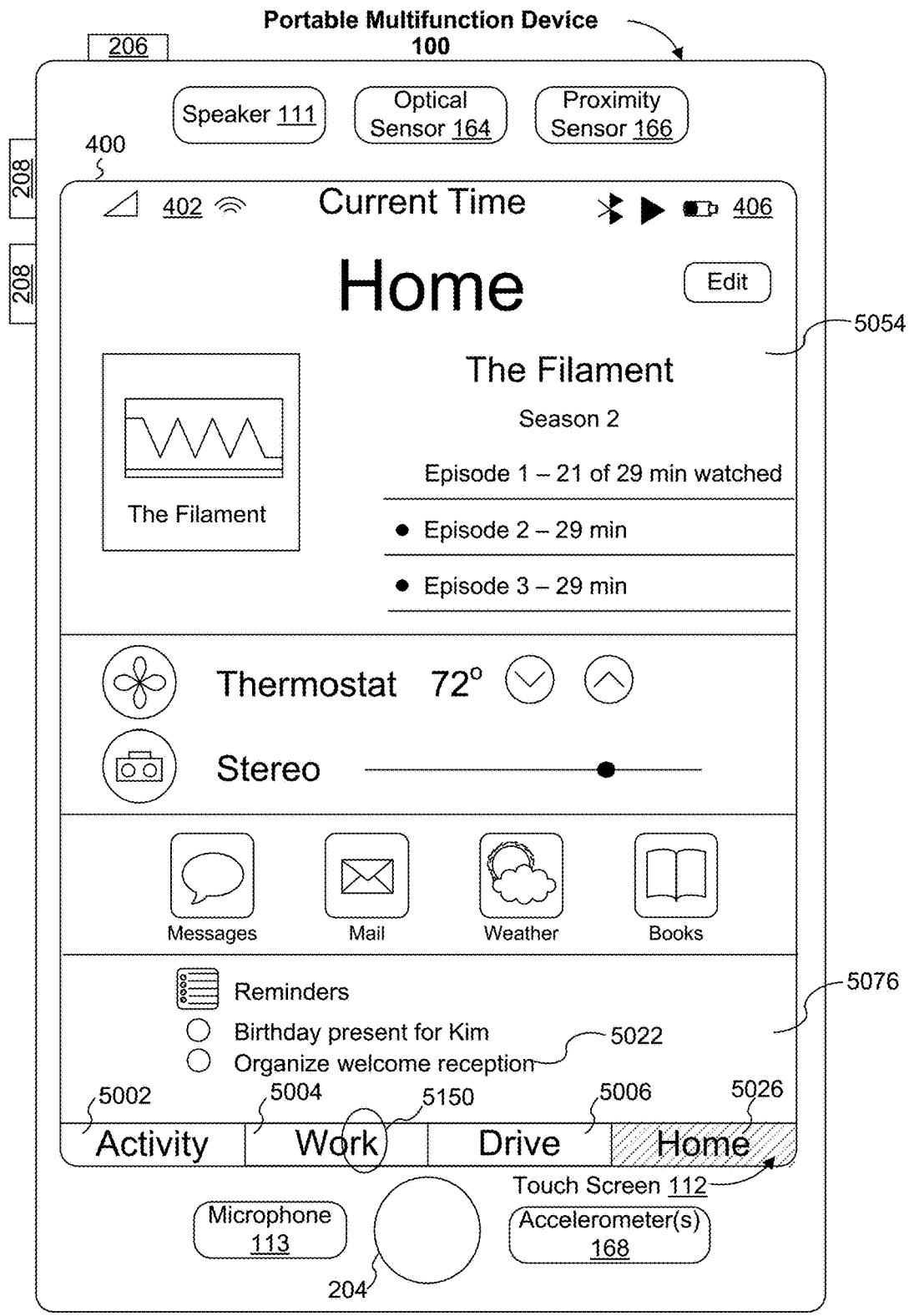

A process for performing an operation in an override mode that is not the currently active mode is illustrated in the series of user interfaces of FIGS. 5I-5M. While a work mode is active (e.g., at a time that is within a time range associated with the work mode), an input is detected to activate the home mode, overriding the currently active work mode. An operation is performed, e.g., while the home mode is overriding the work mode. For example, as indicated in FIG. 5I, in response to user input detected while a focus selector 5078 is at a location corresponding to a mode settings affordance 5028, a mode settings interface 5080 is displayed. In FIG. 5J, a user input is detected while a focus selector 5132 is at a location corresponding to affordance 5122 (e.g., corresponding to an "Add Reminders" setting of a reminders application). In response to detecting the user input while the focus selector 5132 is at the location corresponding to affordance 5122, the device displays additional reminders groups 5136, 5138, 5140, 5142, as indicated at FIG. 5K. FIG. 5K indicates that a user input is detected while a focus selector 5134 is at affordance 5136, corresponding to a "Work Reminders" group to be added to reminder notification area 5076 of work mode interface 5054. As indicated at FIG. 5L, a user input is detected while a focus selector 5144 is at affordance 5146, for applying changes made using mode settings interface 5080 (e.g., to apply the change that used affordance 5136 to add the Work Reminders group to home mode interface 5054). In FIG. 5M, a work group notification ("Organize welcome reception," as shown at 5022 of work mode interface 5014) has been added to home mode interface 5054 in reminders notification area 5076.

Figure 5N:
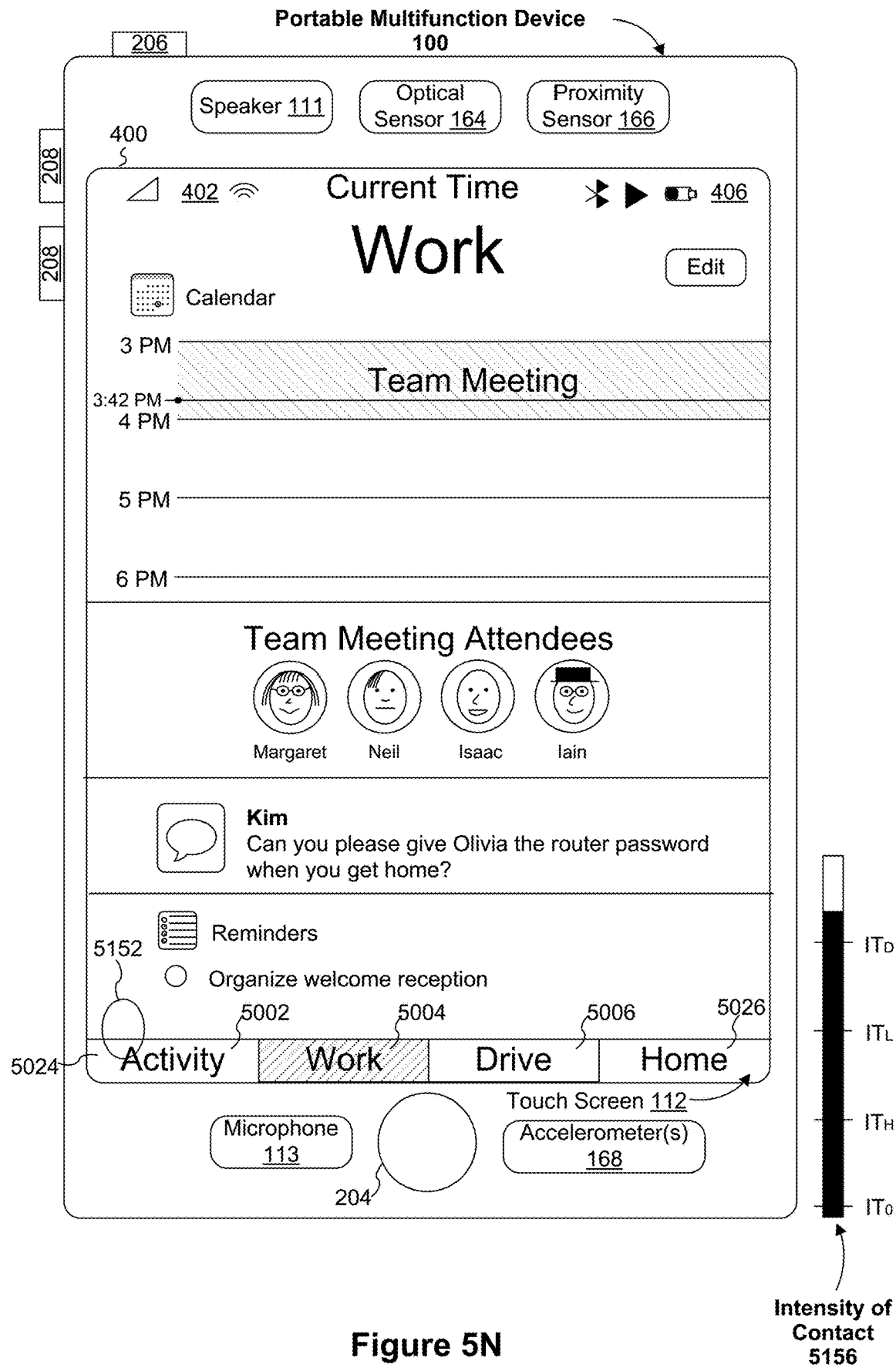

In some embodiments, as indicated in the series of user interfaces of FIGS. 5M-5N, after performing the operation in the overriding home mode (e.g., changing a setting of the home mode by adding the "Work Reminders" group to the home mode interface 5054), the device returns to the work mode. In some embodiments, returning to the work mode includes detecting user input, such as user input received while a focus selector 5150 is at work mode affordance 5004, as shown in FIG. 5M, and in response to detecting the user input, displaying the work mode interface 5014, as shown in FIG. 5N.

Figure 5O:
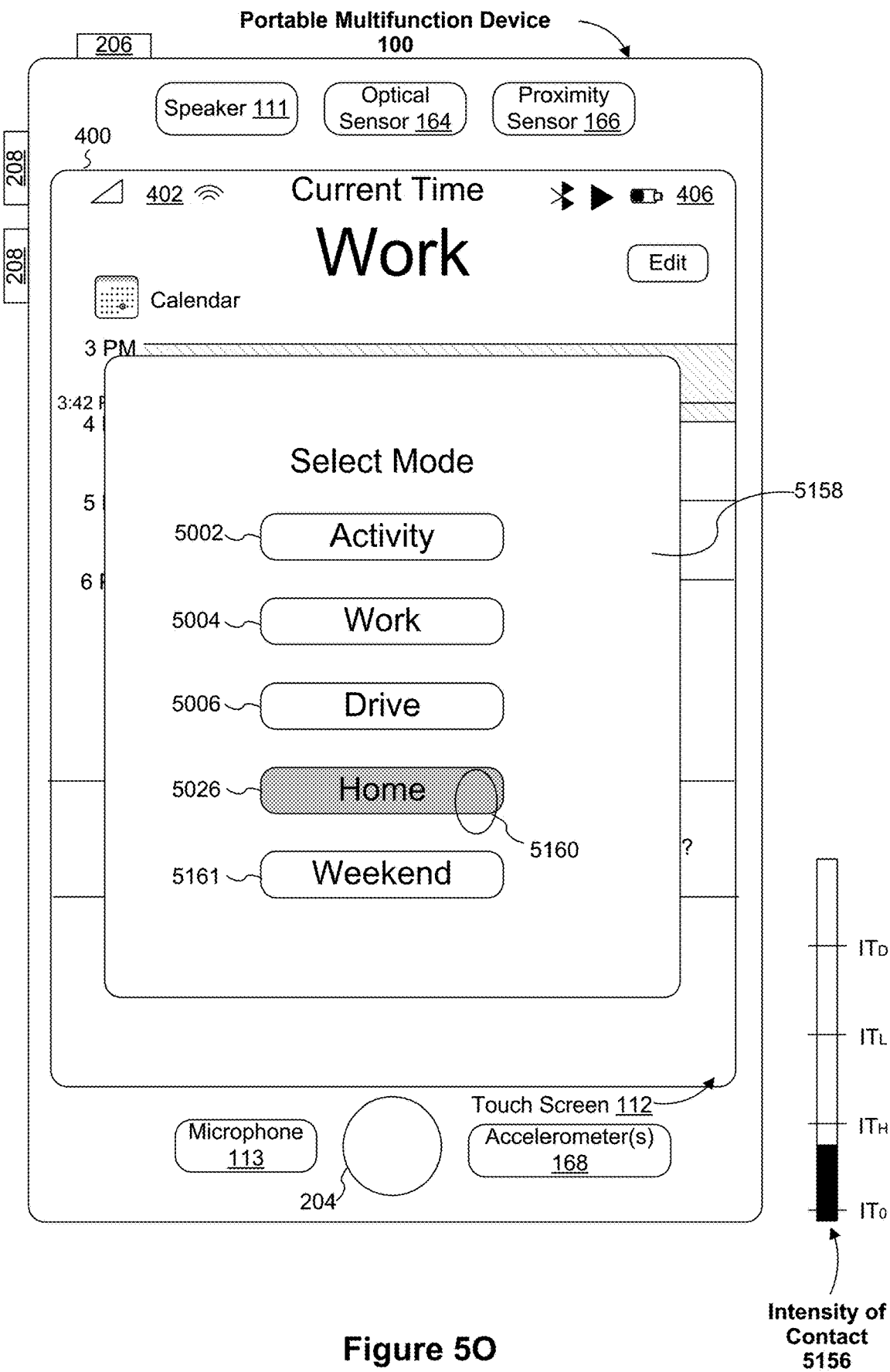
Figure 5P:
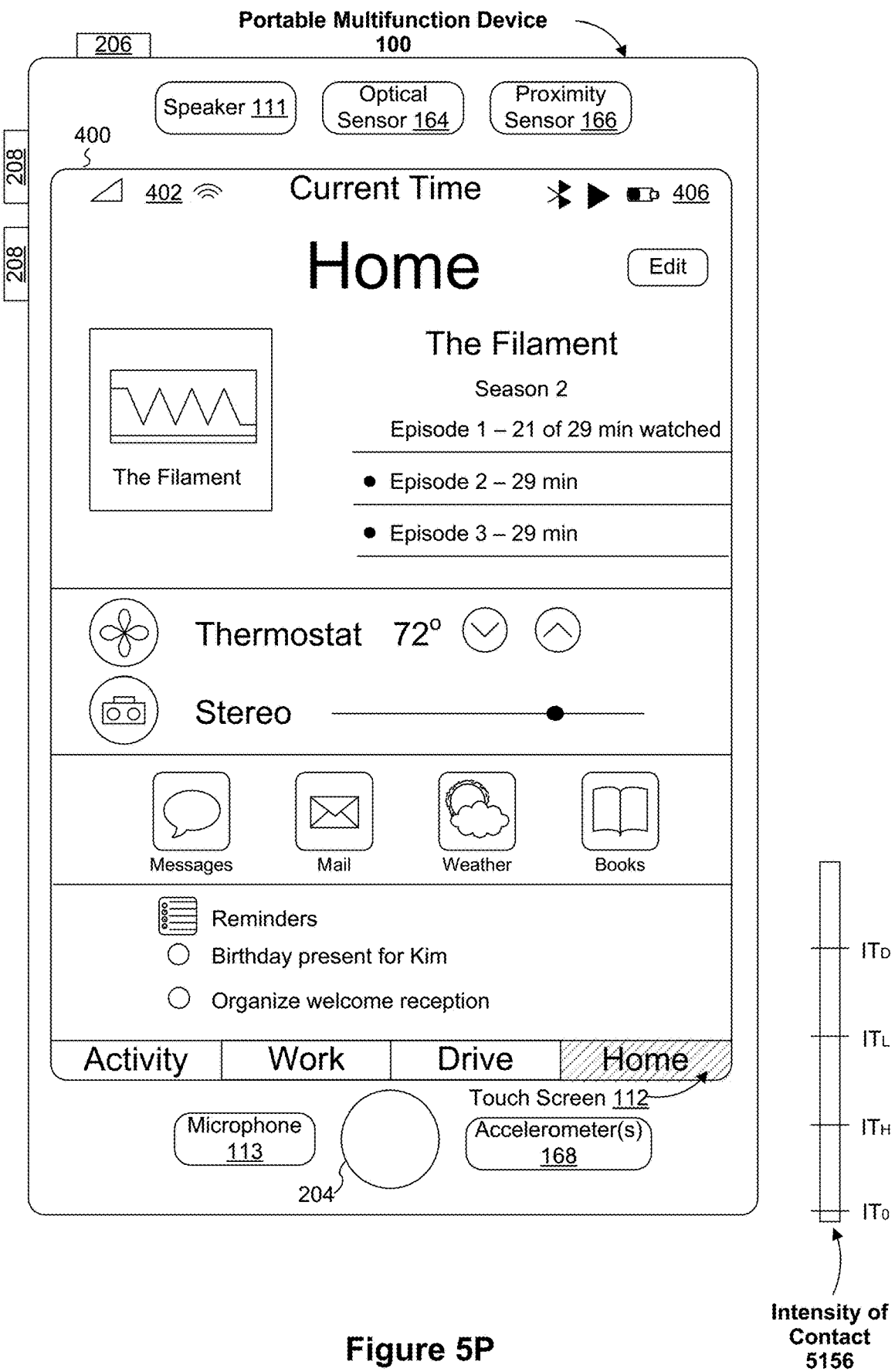

In some embodiments, as indicated in the series of user interfaces of FIGS. 5N-5P, a list of mode affordances for the modes of the device is displayed in response to user input that includes an increase in a characteristic intensity of a contact on a touch-sensitive surface above a mode display intensity threshold. For example, in FIG. 5N, a contact on touch screen 112 is detected while a focus selector 5152 is at a location corresponding to mode affordance chrome 5024. In response to determining that a characteristic intensity of the contact has increased above a mode display intensity threshold (e.g., a deep press intensity threshold ITS, as illustrated at contact intensity meter 5156, or another intensity threshold such as a light press intensity threshold $IT_L$), a mode selection interface 5158 is displayed, as indicated at FIG. 5O. In some embodiments, mode selection interface 5158 includes all of the modes of the device (e.g., including modes not shown in mode affordance chrome 5024, such as weekend mode affordance 5161). In some embodiments, mode selection interface includes a subset, less than all, of the modes of the device (e.g., and modes not currently displayed are accessible via input that scrolls the listed modes). As indicated in FIG. 5O, a contact/focus selector 5160 is at a position corresponding to a home mode affordance 5026. In response to the detected contact (e.g., a contact having a characteristic intensity above a contact detection threshold $IT_0$), the home mode interface 5054 is displayed, as indicated at FIG. 5P.

In some embodiments, (e.g., when a user input meets information item movement criteria), a gesture is used to override a current mode, remove the information item from the current mode, activate an alternate mode, and/or add an information item to the alternate mode. In some embodiments, a user input meets information item movement criteria when the duration of a contact with touch screen 112 exceeds a threshold duration. In some embodiments, as explained below with reference to FIGS. 5Q-5U, a user input meets information item movement criteria when a characteristic intensity of a detected contact is above a threshold intensity.

Figure 5Q:
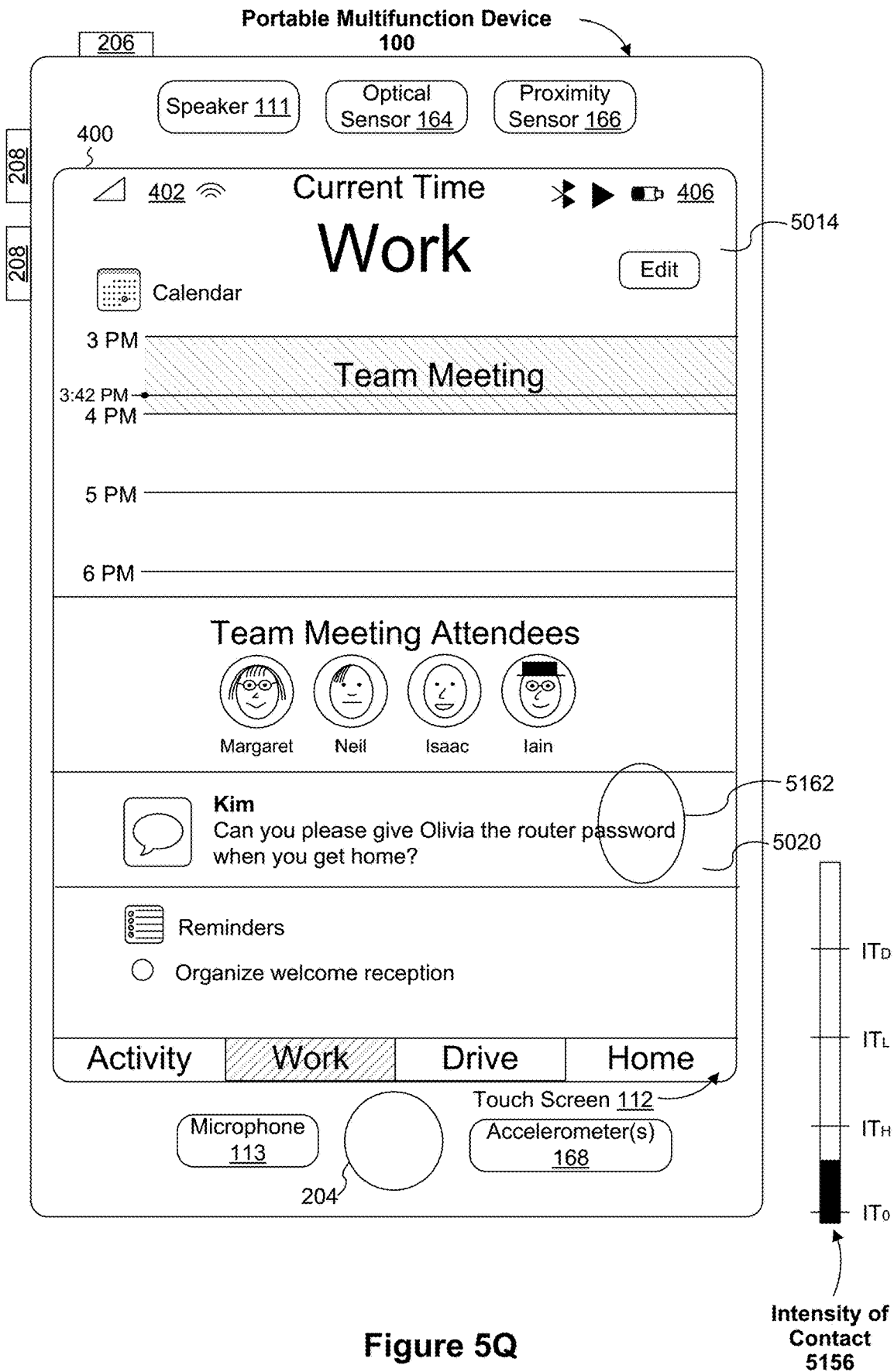
Figure 5R:
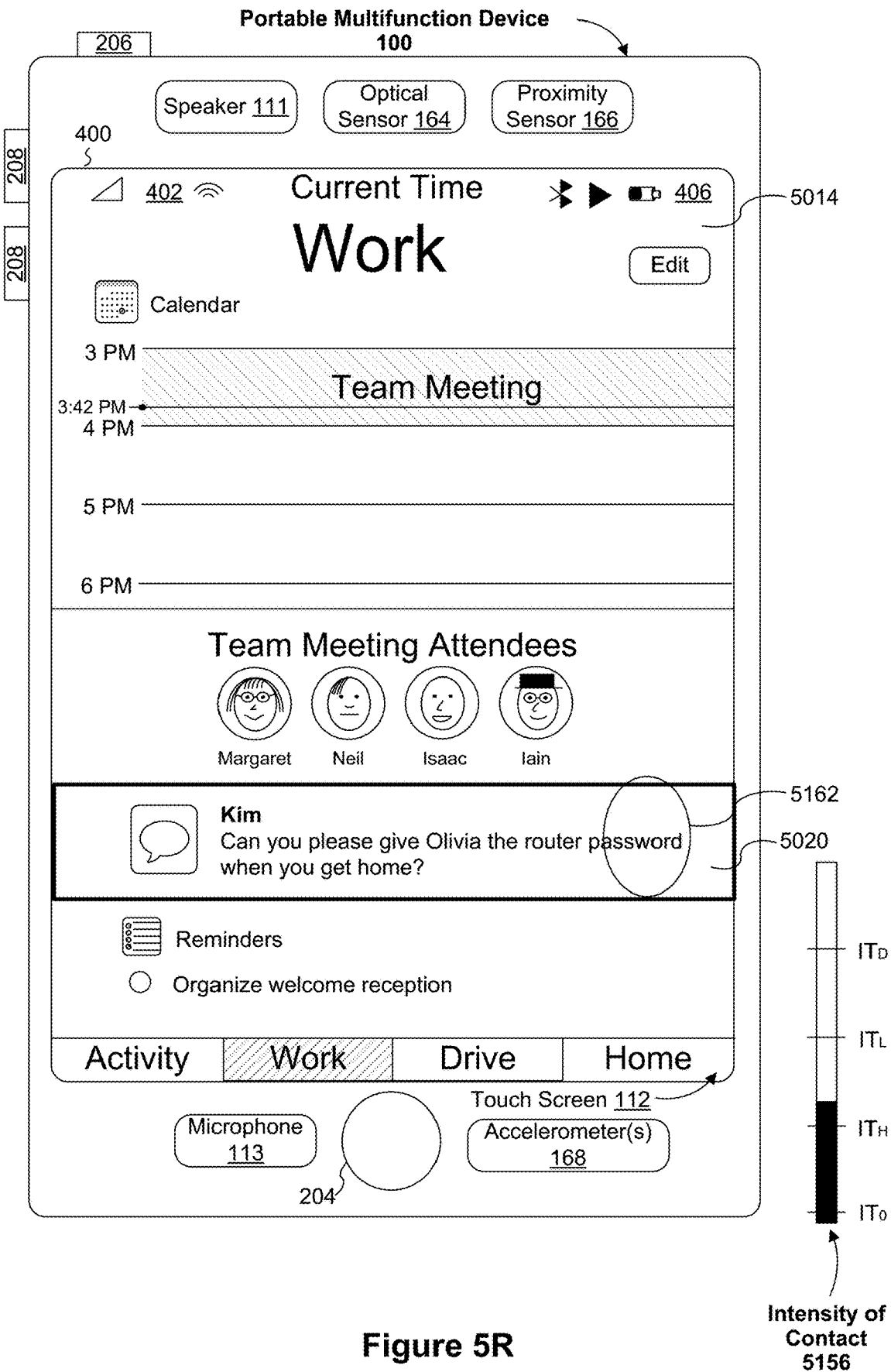
Figure 5S:
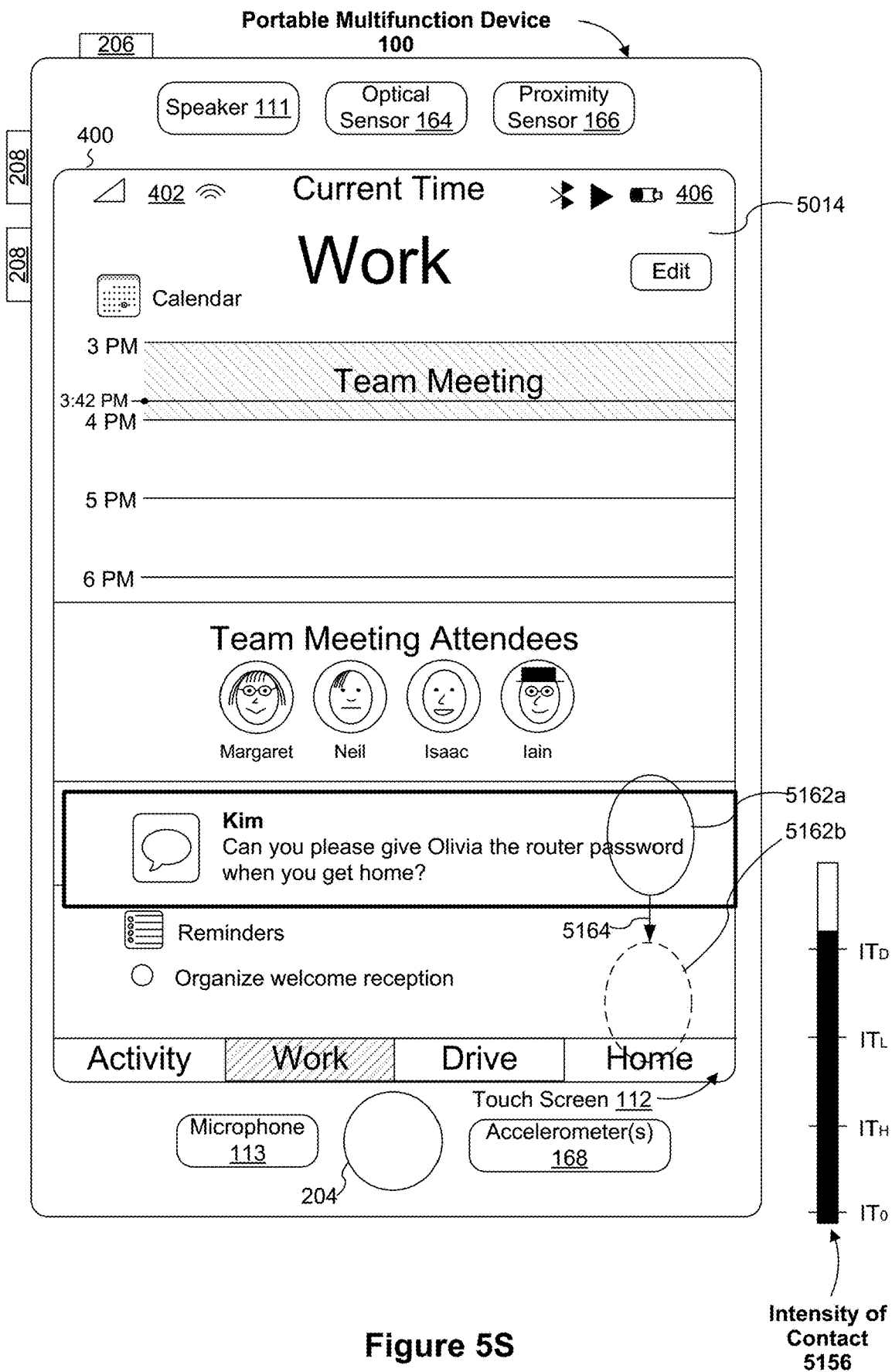
Figure 5T:
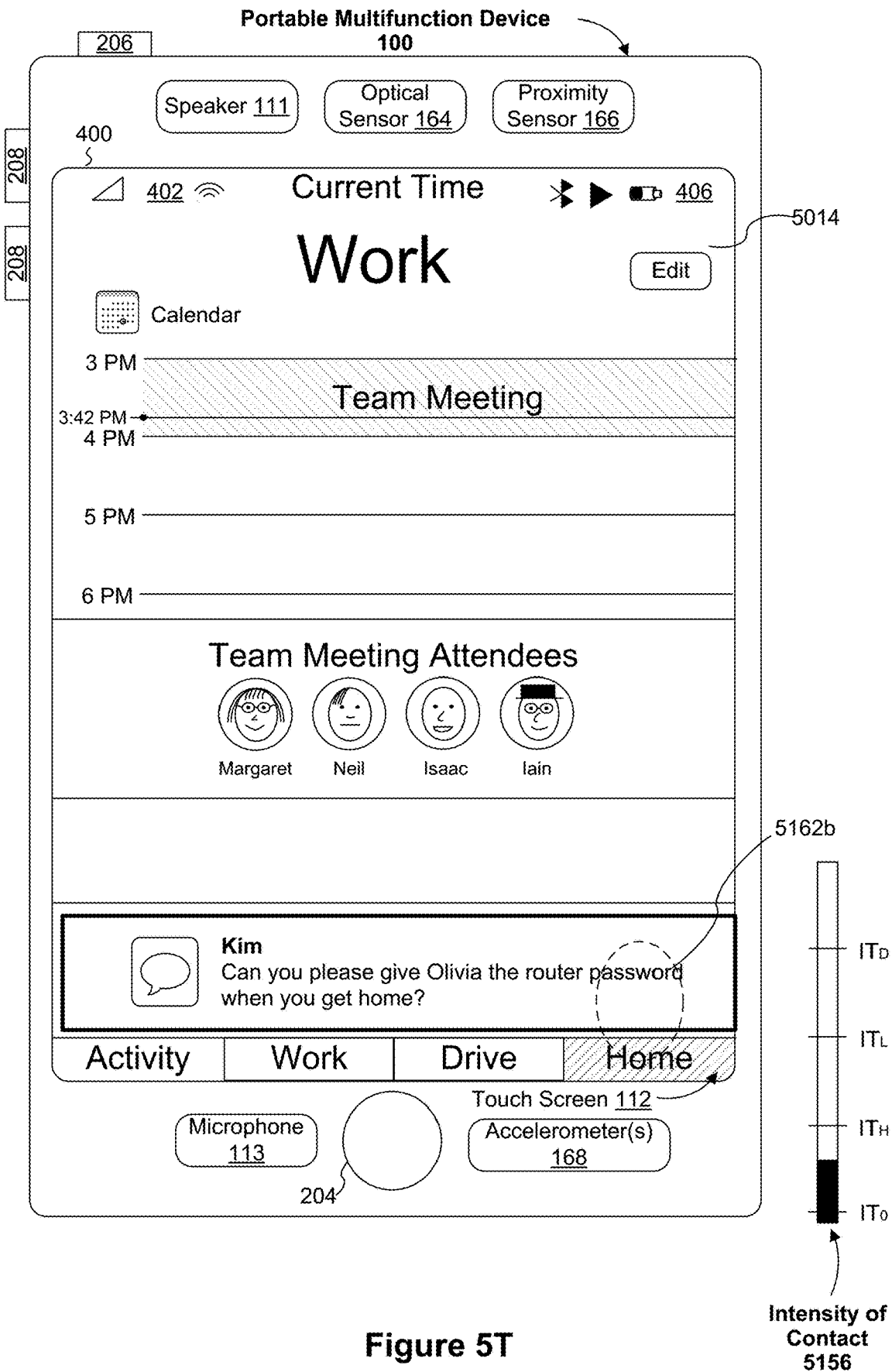
Figure 5U:
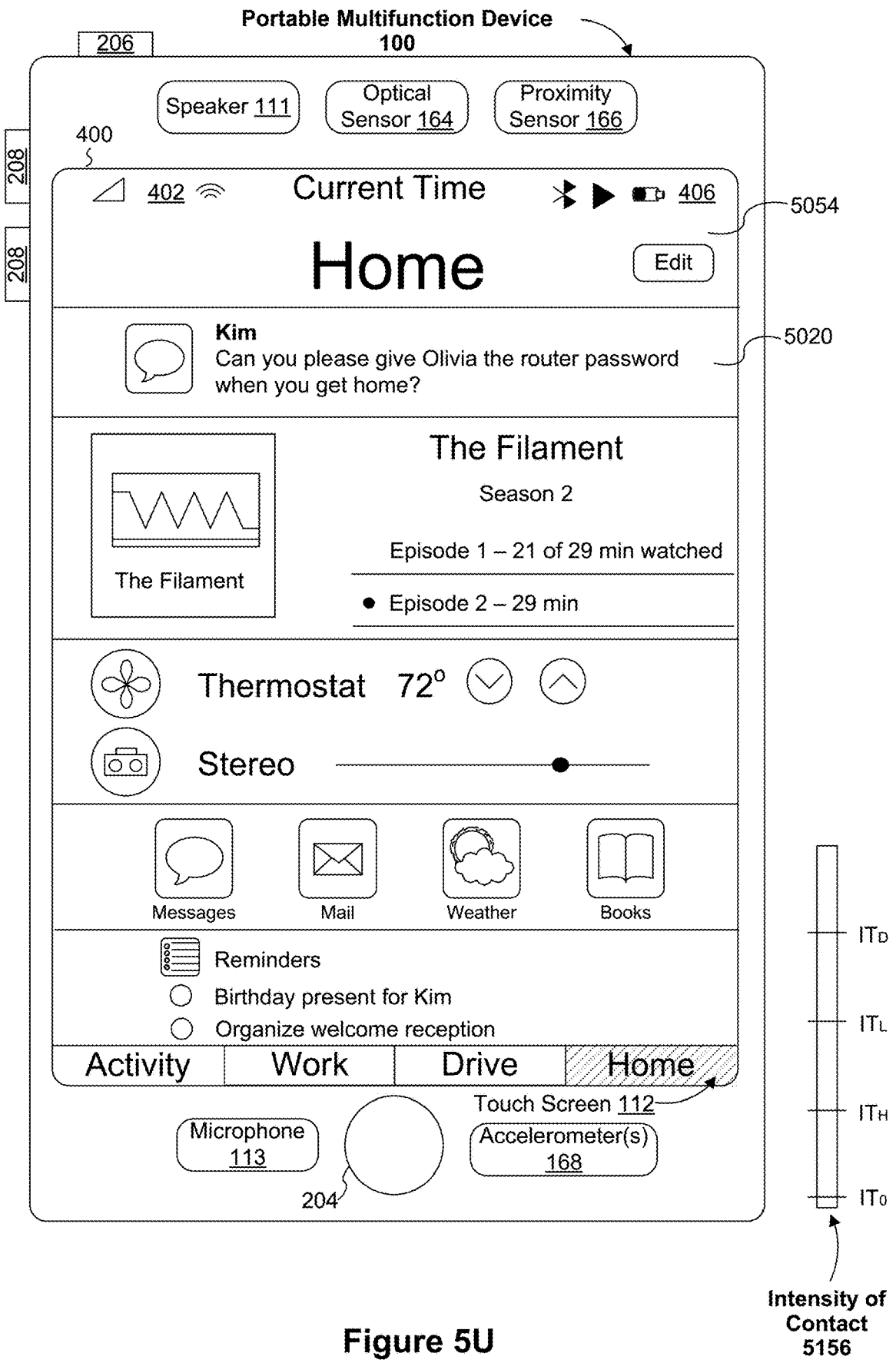

FIGS. 5Q-5U illustrate an input detected to activate the home mode, (e.g., thereby overriding the work mode) and an operation is performed while the home mode is activated and the work mode is overridden, in accordance with some embodiments. In FIG. 5Q, a work mode interface 5014 including message notification 5020 is displayed. A contact/focus selector 5162 is at a position corresponding to message notification 5020. The contact has a characteristic intensity above a contact detection threshold $IT_0$, as indicated at contact intensity meter 5156.

As shown in FIG. 5R, when a characteristic intensity of a detected contact at is above a hint intensity threshold, an information item at a location corresponding to the location of the contact is highlighted. For example, in FIG. 5R, a characteristic intensity of the detected contact at a location indicated by focus selector 5162 (corresponding to a location of message notification 5020) is above a hint intensity threshold (e.g., above a contact detection threshold $IT_H$ as indicated by contact intensity meter 5156). In response to detecting the characteristic intensity of the contact above the hint intensity threshold, an information item at a location corresponding to focus selector 5162 (e.g., message notification 5020) is visually distinguished from other information items of work mode interface 5014. For example, message notification is shown with a bold outline, as shown in FIG. 5R.

In FIG. 5S, a characteristic intensity of the detected contact (e.g., at a location indicated by focus selector 5162a) is above an information item movement relocation threshold (e.g., above a light press threshold $IT_D$ as indicated by contact intensity meter 5156, or above another intensity threshold). In response to detecting a characteristic intensity of the contact above the movement relocation threshold, an information item at a position corresponding to the contact (e.g., message notification 5020) is displayed detached from its current location. After message notification 5020 is detached from its current location, message notification 5020 is movable to a different mode. For example, as indicated at FIGS. 5S-5T, the user input includes a gesture, such as a gesture that moves the contact from a first location of the focus selector at 5162a to a subsequent location of the focus selector at 5162b along a path indicated by arrow 5164. In some embodiments, the message notification is "attached" to the contact/focus selector and moves along a path 5164 as the contact/focus selector moves along the path 5164. In some embodiments, the received gesture overrides the work mode, activates the home mode, and adds the message notification 5020 to the home mode. In some embodiments, the message notification 5020 is displayed in home mode interface 5054, as indicated at FIG. 5U.

In some embodiments, a user input (e.g., received after a characteristic intensity of the detected contact is above an information item movement relocation threshold) is a gesture that moves contact/focus selector 5162 to the left. When the movement to the left exceeds a mode change threshold distance, the gesture overrides the work mode, activates the activity mode, and adds message notification 5020 to an activity mode interface (because the activity mode is the mode preceding the current mode, e.g., as indicated by the location of activity mode affordance 5002 to the left of work mode affordance 5004 in mode affordance chrome 5024). In some embodiments, a user input (e.g., received after a characteristic intensity of the detected contact is above an information item movement relocation threshold) is a gesture that moves contact/focus selector 5162 to the right. When the movement to the right exceeds a mode change threshold distance, the gesture overrides the work mode, activates the drive mode, and adds message notification 5020 to drive mode interface 5030 (because drive mode is the mode following the current mode, e.g., as indicated by the location of drive mode affordance 5006 to the right of work mode affordance 5004 in mode affordance chrome 5024).

In some embodiments, when message notification 5020 is added to another mode, such as an activity mode (e.g., an activity mode interface), a drive mode (e.g., drive mode interface 5030), or a home mode (e.g., home mode interface 5054), message notification 5020 is removed from the work mode (e.g., message notification 5020 is no longer displayed in work mode interface 5014).

FIGS. 6A-6C illustrate a flow diagram of a method 600 of overriding a device mode, in accordance with some embodiments. The method 600 is performed at an electronic device (e.g., device 300, FIG. 3, or portable multifunction device 100, FIG. 1A) with a display. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to interact with different device modes. The method reduces the number, extent, and/or nature of the inputs from a user when changing device modes, thereby creating a more efficient human-machine interface. For battery-operated electronic devices, enabling a user to changing device modes faster and more efficiently conserves power and increases the time between battery charges.

The device (602) displays a first mode of a plurality of modes of the device. Examples of modes are provided below. In some embodiments, a mode is a mode of the entire device (e.g., the mode provides the primary interface for interacting with device features). In some embodiments, a mode is subsidiary to a primary interface for interacting with device features.

The plurality of modes of the device include (604) the first mode and a second mode. In some embodiments, a mode is a state of the device in which a set of operations that are relevant to, e.g., a place, time and/or an activity of the device or its user are performed, available, or otherwise made prominent on the device. For example, icons for applications relevant to a particular mode are displayed concurrently when the mode is active (e.g., application initiation icons 5068, 5070, 5072, and 5074 are displayed concurrently in home mode interface 5054 when the home mode of the device is active, as indicated in FIG. 5I). In some embodiments, a mode is activated in the foreground (e.g., information associated with a mode, such as a mode interface, is displayed), a mode is activated in the background (e.g., one or more settings associated with the mode are applied to the device), or a mode is activated in the foreground and in the background.

Examples of modes, mode activation criteria, and mode features are described below in Table 1. Time criteria, location criteria, movement criteria, and transit criteria that correspond to the various modes described in Table 1 are explained below.

In some embodiments, time criteria are met when a current time (e.g., determined by the device) is within defined time parameters (e.g., a user input time range, a default time range, and/or an automatically determined time range) for a particular mode (e.g., a mode listed below in Table 1).

In some embodiments, location criteria are met when a current location of the device is within defined location parameters that correspond to a particular mode (e.g., a mode listed below in Table 1). The current location of a device is determined using, e.g., position data determined from GPS, a Wi-Fi network, a location beacon (e.g., iBeacon), and/or Bluetooth pairing (e.g., detecting availability of a Bluetooth connection with a Bluetooth transmitter in a known location, such as an automobile). For example, a device determines that a location criterion is satisfied in response to determining that a current location of the device is within (and/or within a predetermined distance from) a location such as a neighborhood, a city block, an address, a point location, a set of coordinates (e.g. latitude/longitude), and/or another defined boundary (such as a virtual boundary associated with a campus, a building, or a portion of a building). Location parameters are determined, e.g., in accordance with user input (a text and/or map pin entry indicating a location) and/or automatically (e.g., based on data stored by the device, such as a location of the device determined by the device during a typical time frame associated with the mode, data from communications, and/or data from calendar entries). In some embodiments, a device determines that a location criterion is satisfied in response to detecting a signal from a Wi-Fi network that corresponds to a particular mode (e.g., as indicated by a mode settings interface).

In some embodiments, travel criteria are met when a current location of the device does not match a previously defined location, matches a previously defined location for a mode that uses travel criteria, is in a geographic region that is different from the defined home and/or work location (e.g., a different city, state, and/or country), or is beyond a defined distance from a defined home and/or work location.

In some embodiments, movement criteria are met when output from one or more device sensors (e.g., the device accelerometer) indicates a velocity exceeding a predetermined threshold and/or indicates a velocity that falls within a predetermined velocity range. In some embodiments, determining whether device movement meets movement criteria includes determining, at a first time, a first location of the device; determining, at a second time, a second location of the device; determining a distance between the first location of the device and the second location of the device; and, based on a velocity determined from the distance between the first location and the second location divided by the difference between the first time and the second time, determining whether the first movement exceeds a velocity threshold and/or falls within a predetermined velocity range. For example, movement criteria include walking movement criteria (e.g., the velocity exceeds a movement threshold and/or the velocity falls within a range that corresponds to typical walking movement), running movement criteria (e.g., the velocity exceeds a movement threshold and/or the velocity falls within a range that corresponds to typical running movement), bicycling movement criteria (e.g., the velocity exceeds a movement threshold and/or the velocity falls within a range that corresponds to typical bicycling movement), and/or automobile/transit movement criteria (e.g., the velocity exceeds a movement threshold and/or falls within a range that corresponds to typical automobile movement and/or transit movement, such as bus, train, airplane, etc.).

TABLE 1

Mode Examples

| Mode Title | Mode Activation Criteria | Mode Features |
| --- | --- | --- |
| Work Mode | Time criteria (e.g., device time is within a time range that corresponds to typical work hours and/or typical work days of the week) and/or location criteria (e.g., device location corresponds to workplace location) | See, e.g., work mode interface 5014 as illustrated by FIG. 5B |
| Home Mode | Time criteria (e.g., device time is within a time range that corresponds to typical home hours when the user is home) and/or location criteria (e.g., device location corresponds to home location) | See, e.g., work mode interface 5054 as illustrated by FIG. 5I |
| Drive Mode | Time criteria (e.g., time is within a time range that corresponds to typical commute hours), location criteria (e.g., device location corresponds to a typical commute start point, end point, and/or route, and/or the current device location is a location that is not home or work), and/or movement criteria (e.g., device movement meets transit movement criteria). | See, e.g., drive mode interface 5030 as illustrated by FIG. 5D |
| Transit Mode | Time criteria (e.g., device time is within a time range that corresponds to typical commute hours), location criteria (e.g., device location corresponds to typical transit stops and/or a location that is not home or work) and/or movement criteria (e.g., movement meets transit movement criteria) | Transit information applications, navigation information (e.g., a navigation application is activated in a transit mode), and/or place information regarding destinations along a transit line |
| Walk Mode | Time criteria (e.g., device time is within a time range that corresponds to typical commute and/or activity hours), location criteria (e.g., device location corresponds to location that is not home or work) and/or movement criteria (e.g., device movement meets walk movement criteria) | Navigation information (e.g., a navigation application is activated in a walk mode) and/or place information regarding locations in the vicinity of the device |
| On-the-go Mode | Movement criteria (e.g., device movement meets walk movement criteria, run movement criteria, bicycle movement criteria, and/or transit movement criteria) and/or travel criteria | Incorporates features of drive, transit, walk, run, and/or travel modes. |
| Travel Mode | Location Criteria: Detected device location that does not match and/or is beyond a threshold distance from any predefined or predetermined locations associated with another mode of the device | Information applicable to travel, tourism, and/or a particular region, such as a region in which the device is currently located (determined, for example, based on features that users in the region typically use), e.g., one or more translation applications, currency conversion applications, distance conversion applications, size conversion applications, temperature conversion applications, weather applications, editorial content and/or user based content, camera application, and/or photo viewer application. |
| Weekend Mode | Time criteria (e.g., device time corresponds to typical non-work days) and/or location criteria (e.g., device location corresponds to home and/or typical weekend location) | Application icons for applications associated with leisure activities and/or hobbies |

TABLE 1-continued

Mode Examples

| Mode Title | Mode Activation Criteria | Mode Features |
| --- | --- | --- |
| Activity (Workout) Mode | Time criteria (e.g., device time corresponds to typical activity time), location criteria (e.g., device location corresponds to typical activity location, such as the user's gym), and/or movement criteria (e.g., device movement meets run movement criteria, for example, the device user has been moving at a running speed for a predetermined amount of time (e.g., not just running for the bus)). | Fitness and other health and/or nutrition related applications, an interface for selecting a current workout activity for tracking and/or a map that indicates a path traveled by the user during a workout and associated statistics |
| Guest Mode | The phone is in possession of a user other than the owner of the device, e.g., as determined from user input and/or login information | Restricted access to applications, contacts, and/or device settings |
| Venue Mode | Time criteria (e.g., device time corresponds to scheduled event at a venue) and/or location criteria (e.g., device location corresponds to a venue location) | Information regarding performers, vendors, services, and/or artworks) and/or communications within a region associated with the venue |
| "You are here" Mode | No mode criteria are met (for example, the device location is not a location associated with an existing mode, the time is not a time associated with an existing mode, and/or device movement is not a device movement associated with an existing mode). | Information regarding places, events, sales, menus, and/or movies playing. For example, the information is provided for locations near the device location. |
| Default Mode | No mode criteria are met. In some embodiments, a defined mode (e.g., one of the examples of modes listed above) is configured to be used as a default mode that is activated when no mode criteria are met. | Default interface, default operations, and/or default settings. |

The first mode of the device is active (and, in some embodiments, a first mode interface is displayed) when (606) a first set of time and/or device location criteria are met. For example, the first mode is a "work mode" and the first set of criteria are satisfied when a current time as determined by the device falls within a predefined (e.g., defined by the user) or predetermined (e.g., defined from data collected by the device) time range (e.g., work hours) for a user of the mobile device and/or GPS or other location data for the mobile device indicate that the mobile device is at a predefined or predetermined work location for the user.

For example, in FIG. 5A, the device determines that a current time is 2:40 PM. Based on a determination that this current time is within a time range defined by the user to indicate working hours (e.g., 9:30 AM to 6:30 PM), a work mode is active.

The second mode of the device is active (and, in some embodiments, a second mode interface is displayed) when (608) a second set of time and/or device location criteria, distinct from the first set of time and/or device location criteria, are met. For example, the second mode is a "home mode" and the second set of criteria are satisfied when a current time as determined by the device falls within predefined or predetermined time range for the home mode and/or GPS or other location data for the mobile device indicate that the mobile device is at a predefined or predetermined location for the home mode.

While the first set of time and/or device location criteria are met (610) (e.g., and the second set of time and/or device location criteria are not met), and while the first mode of the device is active (e.g., and information associated with a mode, such as a mode interface is displayed), the device detects (612) a first input that overrides the first mode of the device. In some embodiments, the first input is, e.g., a voice command or a gesture (e.g., a contact or other input received while a focus selector is at a location corresponding to a mode affordance, such as a "tap" gesture or mouse-click, and/or a user input that moves a focus selector across a display, such a movement of a contact across a touch-sensitive surface in a "swipe" gesture). In response to detecting the first input, the device activates (614) the second mode of the device. In some embodiments, the device displays information associated with a second mode of the device (e.g., a second mode interface) when the device activates the second mode of the device.

For example, in FIG. 5H, a work mode of the device is active and the device is displaying work mode interface 5014. The device detects a user input while focus selector 5052 is at a location corresponding to home mode affordance 5026. In response to detecting the user input, the device activates a home mode. In some embodiments, activating the home mode includes displaying home mode interface 5054, as indicated in FIG. 5I.

After responding to the first input, while the second mode of the device is active (and, in some embodiments, while information associated with the second mode is displayed) the device detects (616) a second input, such as an input that corresponds to a request to perform an operation in the second mode of the device. In some embodiments, an input that corresponds to a request to perform an operation includes, e.g., a user input for displaying a mode settings interface 5080, a user input for modifying mode settings (e.g., modifications made using mode settings interface 5080), and/or a user input for applying modifications (e.g., user input received at a location corresponding to affordance 5146 for applying changes made using mode settings interface 5080). In some embodiments, an input that corresponds to a request to perform an operation is, e.g., a user input to move an object from a first mode to a second mode (e.g., as described with regard to FIGS. 5Q-5U).

In response to detecting the second input, the device performs (618) an operation in the second mode of the device. For example, the device applies a change made using a mode settings interface 5080 (e.g., when user input is received at a location corresponding to affordance 5146, for applying changes made using mode settings interface 5080 to add a "Work Reminders" group to a reminder notifications area 5076 of home mode interface 5054, as described with regard to FIGS. 5I-5J). In another example, the device adds a message notification 5020 to the home mode interface 5054 (e.g., as described with regard to FIGS. 5Q-5U).

Example operations in the second mode include:
- adding a notification to the second mode (e.g., the second mode interface) such that the notification will be displayed when the second mode is active;
- adding an affordance (e.g., an application initiation icon) to the second mode (e.g., to a second mode interface) such that the affordance will be displayed and/or activated when the second mode is active;
- displaying a second mode interface (e.g., home mode interface 5054);
- displaying a mode settings interface (e.g., home mode settings interface 5080);
- displaying and/or activating a control of the second mode (e.g., a home automation system control, such as 5064, 5066 shown in FIG. 5I);
- displaying and/or playing back media or other content of the second mode (e.g., a video, a song, an image, a news article, a website link, and/or a wallet pass);
- displaying a subset of contacts of the second mode (e.g., a subset that excludes certain contacts and/or a subset of contacts that are only available while the device is in a particular mode or modes);
- restricting outbound communications and/or indications of inbound communications to communications with a particular subset of contacts (e.g., using affordances in a mode settings interface such as 5116, 5518 shown in FIG. 5J);
- displaying a subset of calendar appointment information of the second mode (e.g., meeting, attendees);
- displaying navigation information (e.g., a map and/or directions);
- displaying fuel station information (e.g., locations of fuel stations, prices of fuel at nearby fuel stations);
- displaying a location or pin (e.g., location of parked car);
- enabling, disabling, and/or modifying voice assistant settings (e.g., a voice assistant such as Siri has different users/permissions in different modes);
- displaying indications of applications used while the mode was previously active; and/or
- applying a setting, such as a privacy setting (e.g., a privacy setting applicable to device location and/or ETA sharing), a permission (e.g., while driving mode is active, no notifications are permitted), an access restriction (e.g., restrict access to particular applications and/or content when guest and/or family mode is active), and/or a network setting (e.g., a network type is designated for a particular mode, for example, Wi-Fi is used for a call when home mode is active and LTE is used for a call when on-the-go mode is active).

After performing the operation in the second mode of the device, the device returns (620) to (and, in some embodiments, resumes display of) the first mode of the device. For example, after adding a "Work Reminders" group to a reminder notification area 5076 of home mode interface 5054, the device displays work mode interface 5014. In some embodiments, the device returns to the first mode automatically, such as after a predetermined period of time since detecting the second input and/or at a time when the device enters a sleep state. In some embodiments, the device returns to the first mode in response to the second input (e.g., a second input includes input received at affordance 5146 for applying changes made using mode settings interface 5080). For example, in some embodiments, in response to receiving input at affordance 5146 for applying changes made using mode settings interface 5080, the device displays work mode interface 5014 (e.g., rather than displaying home mode interface 5054 as modified by the second input). In some embodiments, the device returns to the first mode in response to a third input (e.g., a tap gesture received at work mode affordance 5004).

In some embodiments, performing the operation in the second mode of the device (e.g., while the first set of time and/or device location criteria are met and the second set of time and/or device location criteria are not met) includes adding (622) an affordance to the second mode of the device. An affordance is, e.g., an application initiation icon (e.g., an application icon 5068, 5070, 5072, 5074 as shown in FIG. 5I) that, when activated, initiates an application; a control affordance (e.g., a home automation control item 5064, 5066 as shown in FIG. 5I) that, when activated, initiates a function (e.g., of an accessory device); a media affordance (e.g., content episode/chapter information 5060) that, when activated, initiates playback of content; and/or an information affordance (e.g., message notification 5020 as shown in FIG. 5U or reminder notification 5022 in reminder notifications area 5076 as shown in FIG. 5M) that displays information for the respective mode.

In some embodiments, after returning to the first mode of the device, the device determines (624) that the second set of time and/or device location criteria are met and, in response to determining that the second set of time and/or device location criteria are met, the device activates and displays the second mode of the device and the device displays the affordance in the second mode of the device.

For example, the device receives input to override a work mode and activate a home mode, and while the home mode is active, a work mode reminder 5022 is added to home mode interface 5054, as described with regard to FIGS. 5I-5M. After the work mode reminder 5022 is added to home mode interface 5054, the device returns to displaying work mode interface 5014, e.g., in response to an input received at work affordance 5004. Subsequently, in response to determining that time and/or device location criteria for the home mode are met, the device activates its home mode and displays home mode interface 5054. The work mode reminder 5022 of the work mode reminders group is displayed in reminder notifications area 5076 of home mode interface 5054 (because it was previously added to home mode interface 5054).

In some embodiments, overriding the first mode includes (626) ceasing to display the first mode of the device and displaying the second mode of the device. For example, overriding the first mode, as described with regard to FIGS. 5H-5I, includes ceasing to display home mode interface 5014 and displaying work mode interface 5054. In some embodiments, overriding the first mode includes displaying affordances of the second mode without activating settings of the second mode. For example, the device user is able to see how the second mode interface appears, but adjustments to settings are not applied during the override. For example, when overriding a work mode to activate a home mode, affordances of the home mode (e.g., affordances 5056, 5058, 5060, 5062, 5064, 5066, 5068, 5070, 5070, 5074, 5076 of home mode interface 5054) are displayed, but settings (e.g., network settings, such as 5082, 5084, 5086 of FIG. 5J; permission settings; access settings; and/or privacy settings) are not modified, even if the home mode settings differ from the work mode settings.

In some embodiments, second mode settings are implemented after the second mode has been displayed for a predetermined period of time (e.g., a predetermined period of time after the first input is received, after the second mode interface is displayed, and/or after the second input is received). For example, the user provides input to override the work mode with the home mode. After a predetermined period of time (e.g., during which the user does not provide subsequent input to return to the work mode), the device applies the home mode settings.

In some embodiments, a respective mode of the plurality of modes includes (628) one or more affordances. The one or more affordances includes an application affordance (e.g., application initiation icons 5068, 5070, 5072, 5074, as shown in FIG. 5I) that, when activated, initiates an application. The one or more affordances includes a media affordance (e.g., content episode/chapter information 5060), that, when activated, initiates playback of content. For example, playback is initiated from a starting point of the content or from a point that is at or before (e.g., 5 seconds before) a position at which playback of the content was stopped (e.g., while the device was previously in the respective mode). For example, content episode/chapter information 5060 indicates that 21 of 29 minutes of Episode 1 was watched (e.g., when the home mode was previously active). In response to a user input received to select content episode/chapter information 5060 (e.g., a user input received while a focus selector is at a location corresponding to content episode/chapter information 5060), the device initiates playback of Episode 1 from a point in time at which Episode 1 was stopped (or from a point in time slightly before the point in time at which Episode 1 was stopped) during a previous viewing. For example, playback begins at the 21 minute mark (or playback begins 5 seconds before the 21 minute mark) in Episode 1. The one or more affordances includes a control affordance (e.g., a home automation control item 5064, 5066 as shown in FIG. 5I), that, when activated, initiates a function; and/or an information affordance that displays information (e.g., message notification 5020 as shown in FIG. 5U or reminder notification 5022 in reminder notifications area 5076 as shown in FIG. 5M). In some embodiments, an interface (e.g., mode settings interface 5080) is provided for manipulating the inclusion, exclusion, and/or layout of affordances for a mode.

In some embodiments, performing the operation in the second mode of the device includes (630) modifying a setting for a parameter (e.g., a permission setting for an application and/or an access setting for a communication type, a contact, or a user; a privacy setting; or a network setting) in the second mode of the device. For example, mode interface 5080 as shown in FIG. 5J is used to modify a network setting, e.g., via user input received at affordance 5092 (for adding a Wi-Fi network to which the device can connect while the mode is active), affordance 5090 (for removing a Wi-Fi network to which the device can connect while the mode is active), affordance 5096 (to add an accessory device that can connect with the device via Bluetooth), affordance 5094 (to remove an accessory device that can connect with the device via Bluetooth), affordance 5082 (to enable or disable Wi-Fi connectivity while the mode is active), affordance 5084 (to enable/disable cellular connectivity while the mode is active), and affordance 5086 (to enable/disable Bluetooth connectivity while the mode is active).

In some embodiments, after returning to the first mode of the device, the device determines (632) that the second set of time and/or device location criteria are met and, in response to determining that the second set of time and/or location criteria are met, the device initiates the second mode of the device and applies the setting to the parameter of the device.

For example, the device receives input to override a work mode and activate a home mode, as described with regard to FIGS. 5I-5J. While the home mode is active, a network setting is changed (e.g., while the home mode is active, mode settings affordance 5028 is used to access mode settings interface 5080, and in mode settings interface 5080, affordance 5084 is switched to an off state to disable cellular connectivity while the home mode is active). After the cellular connectivity setting is changed for the home mode, the device returns to activating the work mode (e.g., in response to receiving user input at affordance 5146 corresponding to a "Done" option to apply changes). Subsequently, in response to determining that time and/or device location criteria for the home mode are met, the device activates its home mode. When the home mode is activated (e.g., and cellular connectivity is enabled from a previous mode), the device applies the cellular connectivity network setting to disable cellular connectivity.

In some embodiments, overriding the first mode includes (634) applying the setting to the parameter of the device in the second mode. For example, network settings of the home mode indicate that Wi-Fi connectivity is enabled for the home mode. When the device overrides a work mode and activates the home mode (e.g., in response to receiving input to activate the home mode), the device enables Wi-Fi connectivity (e.g., if Wi-Fi connectivity is not already enabled).

In some embodiments, returning to the first mode of the device includes (636) automatically returning to the first mode of the device after a predetermined period of time. In some embodiments, returning to the first mode of the device includes automatically returning to the first mode of the device after the second mode of the device has been active for the predetermined period of time. In some embodiments, returning to the first mode of the device includes automatically returning to the first mode of the device after a predetermined period of time since a user input (e.g., the first user input or the second user input) was received by the device. In some embodiments, returning to the first mode of the device includes automatically returning to the first mode of the device after a predetermined period of time since a change was made to the second mode.

In some embodiments, while the second mode is active (and the first mode is overridden), the device detects (638) a third input (e.g., a voice command and/or a gesture); and, in response to detecting the third input, the device reactivates the first mode of the device. In some embodiments, re-activating the first mode of the device includes displaying a first mode interface (e.g., work mode interface 5014). For example, while the home mode is active and home mode interface 5054 is displayed (e.g., in response to a first input received to override a home mode, as described with regard to FIGS. 5H-5I), after a second input is received to add a reminder notification 5022 to home mode interface 5054, a third input is received (e.g., while a focus selector 5150 is at a location corresponding to work mode affordance 5004, as described with regard to FIG. 5M), and the device returns to the work mode in response to the third input.

In some embodiments, detecting the first input (that overrides the first mode of the device) includes (640) detecting a gesture at a location corresponding to a mode selection affordance. The gesture is, e.g., a tap gesture, a swipe gesture, a drag gesture, a contact that has a characteristic intensity above a threshold intensity level, and/or a combination of these. For example, a first input includes a tap gesture received while a contact/focus selector 5052 is at a location corresponding to home mode affordance 5026 to override a work mode and activate a home mode, as described with regard to FIGS. 5H-5I. In some embodiments, the gesture is a swipe gesture received at indicia of a mode, such as a text indicator displayed in a user interface (e.g., on a lock screen). For example, a first input includes a swipe gesture that includes movement (e.g., by a contact across a touch-sensitive surface 112) of a focus selector 5008 from a position 5008*a* to 5008*c* on a lock screen to override a work mode and activate a drive mode, as described with regard to FIGS. 5E-5G.

In some embodiments, the device includes a touch-sensitive surface 112 and one or more sensors for detecting intensities of contacts on the touch-sensitive surface. While a focus selector is at a location of a mode selection affordance, the device detects (642) an increase in a characteristic intensity of the contact on the touch-sensitive surface 112 above a mode display intensity threshold and, in response to detecting the increase in the characteristic intensity of the contact above the mode display intensity threshold, the device displays a plurality of mode affordances that correspond to at least a subset of the plurality of modes (e.g., as a scrollable list) of the device. For example, a contact with touch-sensitive surface 112 is detected while a focus selector 5152 is at a location of mode affordance chrome 5024, as indicated in FIG. 5N. In response to detecting an increase in the characteristic intensity of the contact above a mode display intensity threshold (e.g., a light press intensity threshold $IT_L$, as indicated by intensity meter 5156, or another intensity threshold), the device displays mode selection interface 5158, as indicated in FIG. 5O.

In some embodiments, detecting the first input (that overrides the first mode of the device) includes receiving a selection of a mode affordance that corresponds to the second mode (e.g., from mode selection interface 5158). For example, detecting the first input includes detecting a contact/focus selector 5160 at a location corresponding to home mode affordance 5026, as indicated at FIGS. 5O-5P.

In some embodiments, the mode selection is received when, after the increase in the characteristic intensity above the mode display intensity threshold is detected, a decrease in the characteristic intensity is detected, followed by a subsequent increase above the mode display intensity threshold. For example, detecting the first input includes detecting a subsequent increase in a characteristic intensity of the contact while focus selector 5160 is at a location corresponding to home mode affordance 5026.

In some embodiments, detecting the first input (that overrides the first mode of the device) includes detecting an increase in the characteristic intensity of the contact on the touch-sensitive surface above a mode selection intensity threshold (e.g., a light press intensity threshold $IT_L$, as indicated by intensity meter 5156, or another intensity threshold) when a focus selector is at an indication of the second mode. For example, in response to detecting an increase in the characteristic intensity of the contact on the touch-sensitive surface above a mode selection intensity threshold when a focus selector 5152 is at a location of activity mode affordance 5002, an activity mode of the device is activated (and, in some embodiments, an activity mode interface is displayed).

In some embodiments (644), the first mode is a work mode (e.g., as indicated by work mode interface 5014) and the second mode is a home mode (e.g., as indicated by home mode interface 5054).

In some embodiments, the first set of time and/or device location criteria are met when (646) at least one of a work time criterion or a work location criterion is satisfied.

In some embodiments, a work time criterion is satisfied when a current time (e.g., determined by the device, e.g., according to a device clock) is within work time parameters. Work time parameters are, e.g., a user input time range (e.g., input via a calendar application), a default time range, and/or an automatically determined time range. A work time range is determined automatically, for example, based on a time range during which a user is typically at a work location (e.g., a work location indicated by the user or a location at which the device is located during a typical work time range). A time range during which a user is typically at a work location is determined, for example, based on data stored by the device, such as a location of the device determined (using GPS, Wi-Fi or other location information) during a typical work time frame, data from calendar entries, and/or data from communications.

In some embodiments, a work location criterion is satisfied when a current location of the device (e.g., a location indicated by positioning data such as positioning data determined from GPS, Wi-Fi network, location beacon (e.g., iBeacon), and/or Bluetooth pairing) is within work location parameters. For example, a device determines that a location criterion is satisfied in response to determining that a current location of the device is within (and/or within a predetermined distance from) a location such as a neighborhood, a city block, an address, a point location, and/or a set of coordinates (e.g. latitude/longitude). Location parameters are determined, e.g., in accordance with user input (a text and/or map pin entry indicating a location) and/or automatically (e.g., based on data stored by the device, such as a location of the device determined by the device during a typical work time frame, data from communications, and/or data from calendar entries). In some embodiments, a device determines that a work location criterion is satisfied in response to detecting a signal from a Wi-Fi network of the work mode (e.g., as indicated by a mode settings interface).

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6C. For example, the contacts, gestures, affordance, user interface objects, intensity thresholds, and focus selectors described above with reference to method 600 optionally have one or more of the characteristics of the contacts, gestures, affordance, user interface objects, intensity thresholds, and focus selectors described herein with reference to other methods described herein (e.g., method 700). For brevity, these details are not repeated here.

The operations described above with reference to FIGS. 6A-6C are, optionally, implemented by components depicted in FIGS. 1A-1B or FIG. 3. For example, detection operations 612 and 614, activation operation 614, performing operation 618 and returning operation 620 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7B illustrate a flow diagram of a method 700 of recommending and activating a device mode from among a plurality of displayed mode affordances, in accordance with some embodiments. The method 700 is performed at an electronic device (e.g., device 300, FIG. 3, or portable multifunction device 100, FIG. 1A) with a display. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to recommend and activate a device mode from among a plurality of displayed mode affordances. The method reduces the number, extent, and/or nature of the inputs from a user when selecting and activating a mode, thereby creating a more efficient human-machine interface. For battery-operated electronic devices, enabling a user to select and activate a mode faster and more efficiently conserves power and increases the time between battery charges.

The device concurrently displays (702) a plurality of mode affordances (e.g., user-activatable icons that correspond to respective modes of the mobile device, such as icons that display thumbnail images of the user interfaces for the respective modes of the mobile device). In some embodiments, the device concurrently displays the plurality of mode affordances on a lock screen. For example, as shown in FIG. 5A, mode affordances 5002, 5004, 5006, corresponding to an activity mode, a work mode, and a drive mode, respectively, are concurrently displayed on a lock screen. In another example, as shown in FIG. 5B, mode affordances 5004, 5004, 5006, 5026, corresponding to an activity mode, a work mode, a drive mode, and a home mode, respectively, are concurrently displayed in a mode affordance chrome 5024.

The plurality of mode affordances includes (704) a first mode affordance that, when activated, initiates a first mode of the mobile device. For example, work mode affordance 5004, when activated (e.g., in response to a user input received when a focus selector 5008 is at a location corresponding to work mode affordance 5004), initiates a work mode of the device and, in some embodiments, displays a work mode interface 5014, as described with regard to FIGS. 5A-5B.

The plurality of mode affordances includes (706) a second mode affordance that, when activated, initiates a second mode of the mobile device, distinct from the first mode of the mobile device. For example, drive mode affordance 5006, when activated (e.g., in response to a user input received when a focus selector 5008 is at a location corresponding to drive mode affordance 5006), initiates a drive mode of the device and, in some embodiments, displays a drive mode interface 5030, as described with regard to FIGS. 5C-5D.

The device is configured to recommend (708) activating a respective mode of the device in accordance with a determination that a respective set of time and/or device location criteria that correspond to the respective mode of the device are met. For example, in FIG. 5A, a work mode is recommended as indicated by, e.g., the shading and/or bold text of mode affordance 5004. In another example, in FIG. 5B, a work mode is recommended (and/or is currently active) as indicated by, e.g., the shading of mode affordance 5004. In some embodiments, the recommendation is automatically provided. For example, the recommendation is automatically provided, e.g., in response to waking the device from a sleep state, in response to detecting that time and/or location criteria for a respective mode are met, and/or in response to detecting that no time and/or location criteria for the plurality of modes are met (in which case, in some embodiments, a default mode is recommended).

In some embodiments, the device determines (710) that a first set of time and/or device location criteria that correspond to the first mode of the device are met. For example, the device determines that a first set of time and/or device location criteria that correspond to the work mode of the device are met, e.g., as described with regard to (646) above.

In response to determining that the first set of time and/or device location criteria are met, the device displays (712) a visual indication that corresponds to a recommendation to activate the first mode of the device. In some embodiments, the first mode of the device is recommended for activation by visually distinguishing the first mode affordance from the other mode affordances in the plurality of mode affordances (e.g., by highlighting the first mode affordance, enlarging the first mode affordance and/or altering displayed text of the first mode affordance). For example, in FIG. 5A, to indicate that the work mode is recommended for activation, work mode affordance 5004 is shaded and the text of work mode affordance 5004 is bolded. In some embodiments, to indicate that the work mode is recommended for activation, work mode interface 5014 is displayed, as indicated in FIG. 5B.

While the first set of time and/or device location criteria are met and the visual indication that corresponds to the recommendation to activate the first mode of the device is displayed, the device detects (714) activation of a respective mode affordance in the plurality of concurrently displayed mode affordances. For example, the device detects activation of a work mode (e.g., the device detects a user input received when a focus selector 5008 is at a location corresponding to work mode affordance 5004), as described with regard to FIGS. 5A-5B.

In response to detecting activation of the respective mode affordance in the plurality of concurrently displayed mode affordances, the device (716) ceases to display the plurality of mode affordances and activates a mode of the device that corresponds to the respective mode affordance. For example, in response to detecting a user input received when a focus selector 5008 is at a location corresponding to work mode affordance 5004, the device ceases to display the plurality of mode affordances 5002, 5004, and 5006, as shown in FIG. 5A, and the device activates a work mode (and, in some embodiments, the device displays a work mode interface, as shown in FIG. 5B).

In some embodiments, displaying the visual indication that corresponds to the recommendation to activate the first mode of the device, in response to determining that the first set of time and/or device location criteria are met, occurs (718) while maintaining concurrent display of the plurality of mode affordances. For example, in FIG. 5A, work mode affordance 5004 is shaded and the text of work mode affordance 5004 is bolded to visually distinguish work mode affordance 5004 from activity mode affordance 5002 and drive mode affordance 5006 that are concurrently displayed with work mode affordance 5004.

In some embodiments, in accordance with a determination that the respective mode is a vehicle operation mode, a displayed area of at least one affordance is increased (720) from a default area to a vehicle operation mode area that is larger than the default area. For example, in FIG. 5G, reminder notification 5046 is shown with a first (e.g., default) area, and in FIG. 5D, reminder notification 5046 is shown with a second area that is larger than the first area. In another example, in FIG. 5G, reminder icon 5042 is shown with a first (e.g., default) area, and in FIG. 5D, reminder icon 5042 is shown with a second area that is larger than the first area. In some embodiments, in accordance with a determination that the respective mode is a vehicle operation mode, at least a part of displayed text is increased from a default text size to a vehicle operation mode text size that is larger than the default text size. For example, in FIG. 5G, reminder notification 5046 is shown with a first (e.g., default) text size, and in FIG. 5D, reminder notification 5046 is shown with a second text size that is larger than the first text size. In some embodiments, in accordance with a determination that the respective mode is a vehicle operation mode, at least a part of displayed text is shown in conformance with a minimum text size. In some embodiments, in accordance with a determination that the respective mode is a vehicle operation mode, one or more user interface objects are shown in conformance with a minimum user interface object size.

In some embodiments, detecting activation of the respective mode affordance includes (722) detecting a gesture at a location of the respective mode affordance. The gesture is, e.g., a tap gesture, a swipe gesture, a drag gesture, a contact that has a characteristic intensity above a threshold intensity level, and/or a combination of these. For example, detecting activation of work mode affordance 5004 includes detecting a tap gesture received while a focus selector 5008 is at a location corresponding to work mode affordance 5004, as described with regard to FIGS. 5A-5B. In some embodiments, the gesture is a swipe gesture received at indicia of a mode, such as a text indicator displayed in a user interface (e.g., on a lock screen). For example, detecting activation of drive mode affordance 5006 includes detecting a swipe gesture that includes movement (e.g., by a contact across a touch-sensitive surface 112) of a focus selector 5008 from a position 5008*a* to 5008*c*, as described with regard to FIGS. 5E-5G.

In some embodiments, the device includes (724) a microphone (e.g., microphone 113) and detecting activation of the respective mode affordance includes detecting a voice command that indicates the respective mode affordance. For example, a drive mode of the device is activated in response to a detected voice command (e.g., a voice command including a particular word or phrase, such as the word "drive" or the phrase "drive mode").

In some embodiments, determining whether the first set of time and/or device location criteria are met includes (726) determining a current time at the device (e.g., according to a device clock) and determining whether the current time is within time parameters for the first mode. In accordance with a determination that the current time is within the time parameters for the first mode (e.g., the current time is within the block of time), the device determines that the first set of time and/or device location criteria are met. Time parameters for the first mode are, e.g., a user input block of time (e.g., input via a calendar application), a default block of time, and/or an automatically determined block of time. A block of time for a mode is determined automatically, for example, based on a time range during which a user is typically at a location associated with the mode (e.g., a location indicated by the user).

In some embodiments, determining whether the first set of time and/or device location criteria are met includes (728) determining a current location of the device (e.g., a location indicated by positioning data such as positioning data determined from data acquired by a GPS module and/or Wi-Fi component of the device), and determining whether the current location is within location parameters for the first mode. Determining whether the current location is within location parameters for the first mode, includes, e.g., determining whether the current location is within (or within a predetermined distance from) a designated location such as a neighborhood, a city block, an address, a point location (e.g., designated with a pin on a map), and/or a set of coordinates (e.g. latitude/longitude). In some embodiments, the location is determined automatically or in accordance with user input. In some embodiments, in accordance with a determination that the current location is within the location parameters for the first mode, the device determines that the first set of time and/or device location criteria are met. For example, the device detects a signal produced by Wi-Fi network 5090 ("Hal") that is associated with a home mode, as indicated in FIG. 5J. In response to detecting the signal produced by Wi-Fi network 5090, the device determines that the current location of the device is within location parameters for the home mode of the device.

In some embodiments, determining whether the first set of time and/or device location criteria are met includes (730) determining whether device movement meets movement criteria. For example, in some embodiments, an "on-the-go" mode is activated in response to a determination that device movement meets movement criteria. In some embodiments, movement criteria are met when output from the device accelerometer indicates a velocity exceeding a predetermined threshold. In some embodiments, determining whether device movement meets movement criteria includes determining, at a first time, a first location of the device; determining, at a second time, a second location of the device; determining a distance between the first location of the device and the second location of the device; and, based on the distance between the first location and the second location, determining that the first set of time and/or device location criteria are met.

In some embodiments, one or more features of a mode are user-configured. In some embodiments, the device automatically adds features to (and/or removes features from) a mode, e.g., based on typical usage. For example, the device automatically adds an application icon to home mode interface 5054 for an application that is frequently used when time and/or location criteria for the home mode are met.

In some embodiments, data from modes (e.g., an amount of time during which the mode has been active) is exposed for use by applications of the device and/or an operating system of the device. In some embodiments, information identifying a current mode of the device is available and/or communicated to applications (e.g., third party applications) of the device. In some embodiments, mode interfaces are generated based on user data for the user of the device and/or data about usage of the device.)

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7B. For example, the contacts, gestures, user interface objects, and focus selectors described above with reference to method 700 optionally have one or more of the characteristics of the contacts, gestures, user interface objects, and focus selectors described herein with reference to other methods described herein (e.g., method 600). For brevity, these details are not repeated here.

The operations described above with reference to FIGS. 7A-7B are, optionally, implemented by components depicted in FIGS. 1A-1B or FIG. 3. For example, determination operation 710, detection operation 708, and activation operation 716 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8:
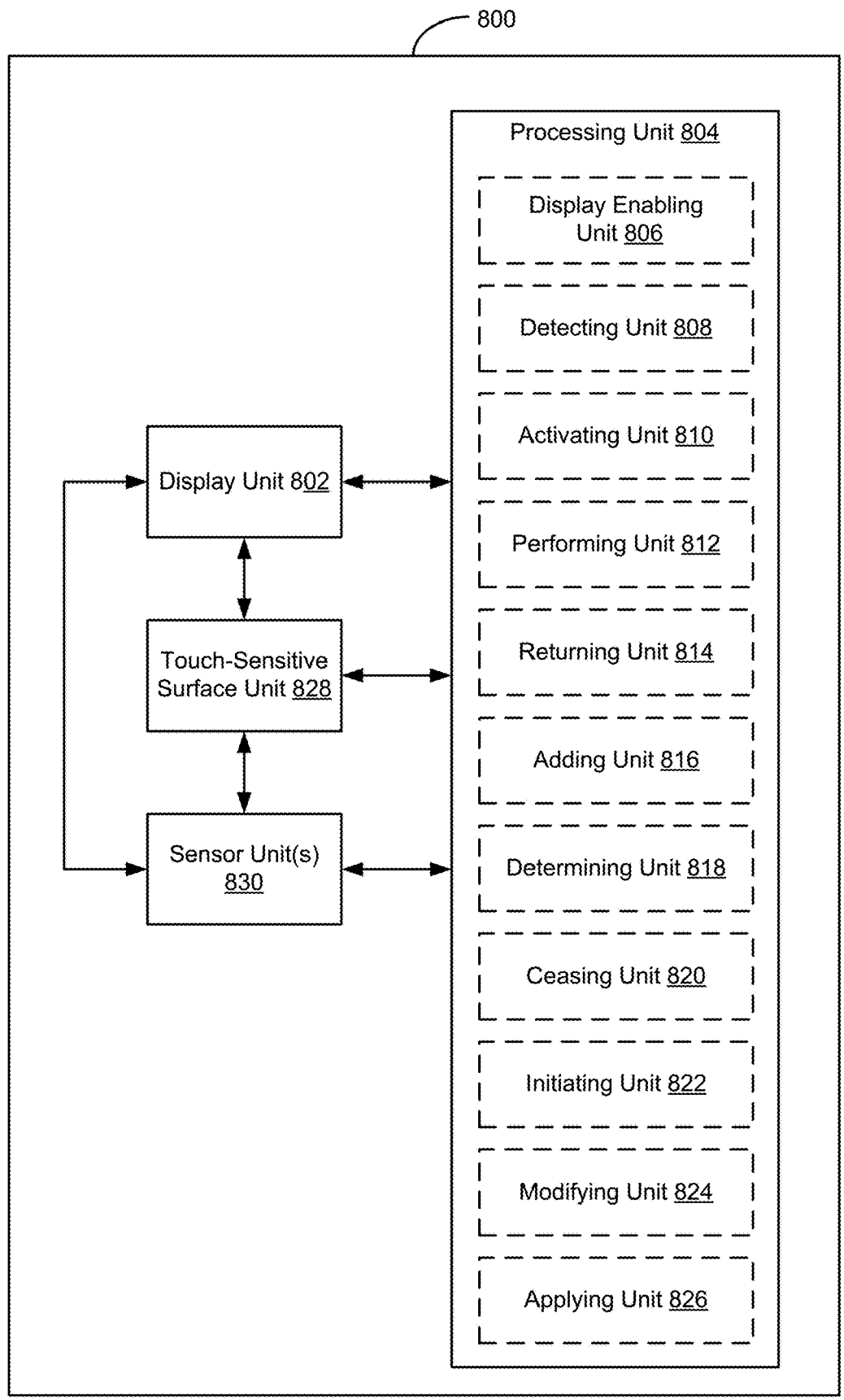
FIGS. 8-9 are functional block diagrams of an electronic device in accordance with some embodiments.

In accordance with some embodiments, FIG. 8 shows a functional block diagram of an electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 includes a display unit 802 configured to display a user interface and a processing unit 804 coupled with the display unit 802. In some embodiments, the processing unit 804 includes: a display enabling unit 806, a detecting unit 808, an activating unit 810, a performing unit 812, a returning unit 814, an adding unit 816, a determining unit 818, a ceasing unit 820, an initiating unit 822, a modifying unit 824, and an applying unit 826.

In some embodiments, the processing unit 804 is configured to: enable display (e.g., with display enabling unit 806) a first mode of a plurality of modes of the device, wherein: the plurality of modes of the device includes the first mode and a second mode; the first mode of the device is active when a first set of time and/or device location criteria are met; and the second mode of the device is active when a second set of time and/or device location criteria, distinct from the first set of time and/or device location criteria, are met; and, while the first set of time and/or device location criteria are met: while the first mode of the device is active, detect (e.g., with detecting unit 808) a first input that overrides the first mode of the device; in response to detecting the first input, activate (e.g., with activating unit 810) the second mode of the device; after responding to the first input, while the second mode of the device is active, detect (e.g., with detecting unit 808) a second input; in response to detecting the second input, perform (e.g., with performing unit 812) an operation in the second mode of the device; and, after performing the operation in the second mode of the device, return (e.g., with returning unit 814) to the first mode of the device.

In some embodiments, performing the operation in the second mode of the device includes adding (e.g., with adding unit 816) an affordance to the second mode of the device.

In some embodiments, the processing unit 804 is configured to: after returning to the first mode of the device, determine (e.g., with determining unit 818) that the second set of time and/or device location criteria are met; and, in response to determining that the second set of time and/or device location criteria are met: activate (e.g., with activating unit 810) and enable display (e.g., with display enabling unit 806) of the second mode of the device; and enable display (e.g., with display enabling unit 806) of the affordance in the second mode of the device.

In some embodiments, overriding the first mode includes ceasing (e.g., with ceasing unit 820) to display the first mode of the device and enabling display of the second mode of the device.

In some embodiments, a respective mode of the plurality of modes includes one or more affordances, and the one or more affordances includes: an application affordance that, when activated, initiates (e.g., with initiating unit 822) an application; a media affordance, that, when activated, initiates (e.g., with initiating unit 822) playback of content; a control affordance, that, when activated, initiates (e.g., with initiating unit 822) a function; and/or an information affordance that displays information.

In some embodiments, performing the operation in the second mode of the device includes modifying (e.g., with modifying unit 824) a setting for a parameter in the second mode of the device.

In some embodiments, the processing unit 804 is configured to: after returning to the first mode of the device, determine (e.g., with determining unit 818) that that the second set of time and/or device location criteria are met; and in response to determining that the second set of time and/or location criteria are met: initiate (e.g., with initiating unit 822) the second mode of the device; and, apply (e.g., with applying unit 826) the setting to the parameter of the device.

In some embodiments, overriding the first mode includes applying (e.g., with applying unit 826) the setting to the parameter of the device in the second mode.

In some embodiments, returning to the first mode of the device includes automatically returning (e.g., with returning unit 814) to the first mode of the device after a predetermined period of time.

In some embodiments, the processing unit 804 is configured to: while the second mode is active, detect (e.g., with detecting unit 808) a third input; and, in response to detecting the third input, re-activate (e.g., with activating unit 810) the first mode of the device.

In some embodiments, detecting the first input includes detecting a gesture at a mode selection affordance.

In some embodiments, the electronic device 800 includes a touch-sensitive surface unit 828 (e.g., coupled with the processing unit 804) configured to receive contacts and one or more sensor units 830 (e.g., coupled with the processing unit 804) for detecting intensity of contacts on the touch-sensitive surface unit 828. The processing unit 804 is configured to: while a focus selector is at a location of a mode selection affordance, detecting (e.g., with detecting unit 808) an increase in a characteristic intensity of the contact on the touch-sensitive surface unit 828 above a mode display intensity threshold; and, in response to detecting the increase in the characteristic intensity of the contact above the mode display intensity threshold, enable display (e.g., with display enabling unit 806) of a plurality of mode affordances that correspond to at least a subset of the plurality of modes of the device; wherein detecting the first input includes receiving a selection of a mode affordance that corresponds to the second mode.

In some embodiments, the first mode is a work mode and the second mode is a home mode.

In some embodiments, the first set of time and/or device location criteria are met when at least one of a work time criterion or a work location criterion is satisfied, a work time criterion is satisfied when a current time is within work time parameters; and a work location criterion is satisfied when a current location of the device is within work location parameters.

Figure 9:
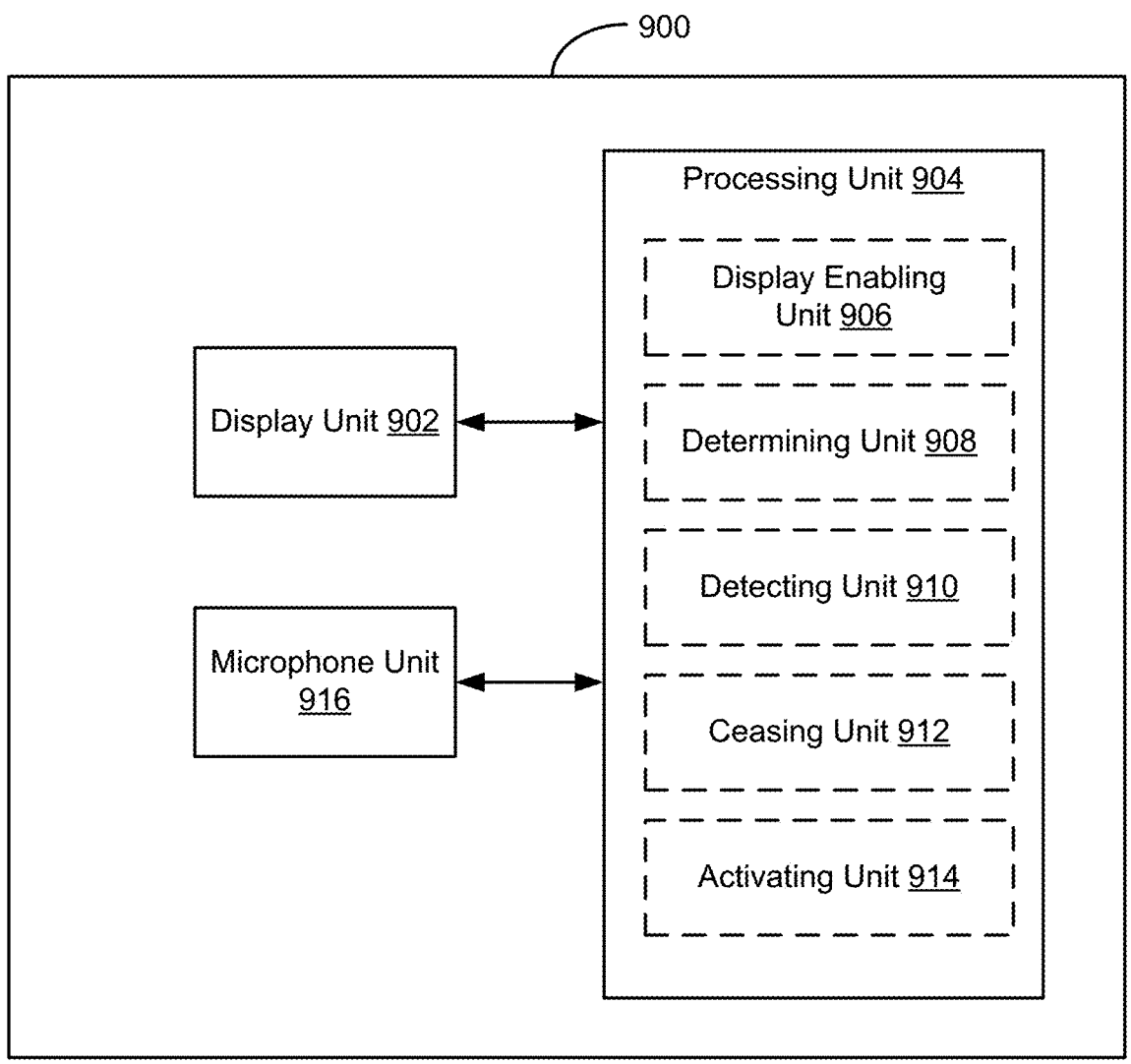

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display a user interface and a processing unit 904 coupled with the display unit 902. In some embodiments, the processing unit 904 includes: a display enabling unit 906, a determining unit 908, a detecting unit 910, a ceasing unit 912, and an activating unit 914.

The processing unit 904 is configured to concurrently enable display (e.g., with display enabling unit 906) of a plurality of mode affordances, wherein the plurality of mode affordances includes a first mode affordance that, when activated, initiates a first mode of the mobile device; the plurality of mode affordances includes a second mode affordance that, when activated, initiates a second mode of the mobile device, distinct from the first mode of the mobile device; and the mobile device is configured to recommend activating a respective mode of the device in accordance with a determination that a respective set of time and/or device location criteria that correspond to the respective mode of the device are met; determine (e.g., with determining unit 908) that a first set of time and/or device location criteria that correspond to the first mode of the device are met; in response to determining that the first set of time and/or device location criteria are met, enable display (e.g., with display enabling unit 906) of a visual indication that corresponds to a recommendation to activate the first mode of the device; while the first set of time and/or device location criteria are met and the visual indication that corresponds to the recommendation to activate the first mode of the device is displayed, detect (e.g., with detecting unit 910) activation of a respective mode affordance in the plurality of concurrently displayed mode affordances; and, in response to detecting activation of the respective mode affordance in the plurality of concurrently displayed mode affordances: cease (e.g., with ceasing unit 912) to display the plurality of mode affordances; and activate (e.g., with activating unit 914) a mode of the device that corresponds to the respective mode affordance.

In some embodiments, enabling display of the visual indication that corresponds to the recommendation to activate the first mode of the device, in response to determining that the first set of time and/or device location criteria are met, occurs while maintaining concurrent display of the plurality of mode affordances.

In some embodiments, in accordance with a determination that the respective mode is a vehicle operation mode, a displayed area of at least one affordance is increased from a default area to a vehicle operation mode area that is larger than the default area.

In some embodiments, detecting activation of the respective mode affordance includes detecting a gesture at a location of the respective mode affordance.

In some embodiments, the electronic device 900 includes a microphone unit 916 (e.g., coupled with processing unit 904); and detecting activation of the respective mode affordance includes detecting a voice command that indicates the respective mode affordance.

In some embodiments, determining whether the first set of time and/or device location criteria are met includes: determining a current time at the device, and determining whether the current time is within time parameters for the first mode; and in accordance with a determination that the current time is within the time parameters for the first mode, determine (e.g., with determining unit 908) that the first set of time and/or device location criteria are met.

In some embodiments, determining whether the first set of time and/or device location criteria are met includes: determining a current location of the device, and determining whether the current location is within location parameters for the first mode; and in accordance with a determination that the current location is within the location parameters for the first mode, determine (e.g., with determining unit 908) that the first set of time and/or device location criteria are met.

In some embodiments, determining whether the first set of time and/or device location criteria are met includes determining whether device movement meets movement criteria.

The operations in the information processing methods described above are, optionally implemented by running one or more functional modules in information processing apparatus such as general purpose processors (e.g., as described above with respect to FIGS. 1A and 3) or application specific chips.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A computing device, comprising:
   a display device;
   one or more processors;
   one or more input devices;
   memory; and
   one or more programs, wherein the one or more programs are stored in the memory and configured to be executed by the one or more processors, the one or more programs including instructions for:
   displaying, via the display device, a graphical indication of a first mode;
   while displaying the graphical indication of the first mode, receiving, via the one or more input devices, a request to edit the first mode;
   in response to receiving the request to edit the first mode, displaying, via the display device, a first editing user interface that includes a plurality of editable settings for the first mode, including a visual representation of a setting for whether or not notifications for a first application are permitted to be output during the first mode;
   while displaying the first editing user interface, detecting, via the one or more input devices, one or more user inputs that change the setting;
   after exiting the first editing user interface, activating the first mode;
   while the computing device is in the first mode, detecting an occurrence of an event corresponding to the first application; and
   in response to detecting the occurrence of the event corresponding to the first application:
      in accordance with a determination that the setting permits notifications for the first application to be output while the computing device is in the first mode, outputting a notification corresponding to the event; and
      in accordance with a determination that the setting does not permit notifications for the first application to be output while the computing device is in the first mode, forgoing outputting the notification corresponding to the event.

2. The computing device of claim 1, wherein the first editing user interface includes an option to specify contacts from whom communication notifications are displayed while the computing device is in the first mode.

3. The computing device of claim 1, wherein the first editing user interface includes an option to add an application icon to a home screen displayed while the computing device is in the first mode.

4. The computing device of claim 3, wherein:
   the home screen displayed while the computing device is in the first mode includes an application icon for a reminder application; and
   the first editing user interface includes a setting for configuring which reminder notifications are displayed by the reminder application while the computing device is in the first mode.

5. The computing device of claim 1, wherein the first editing user interface includes an affordance for adjusting network settings while the computing device is in the first mode.

6. The computing device of claim 1, wherein displaying the graphical indication of the first mode includes displaying a summary of settings available in the first editing user interface.

7. The computing device of claim 1, wherein the first mode is one of a plurality of distinct modes for the computing device.

8. The computing device of claim 7, the one or more programs including instructions for:
   while displaying the first editing user interface, detecting a user input that includes a horizontal component; and
   in response to detecting the user input that includes the horizontal component, displaying a second editing user interface for a second mode of the plurality of distinct modes, wherein the second mode is different from the first mode.

9. A method, comprising:
   at a computing device that is in communication with a display device and one or more input devices;
   displaying, via the display device, a graphical indication of a first mode;
   while displaying the graphical indication of the first mode, receiving, via the one or more input devices, a request to edit the first mode;
   in response to receiving the request to edit the first mode, displaying, via the display device, a first editing user interface that includes a plurality of editable settings for the first mode, including a visual representation of a setting for whether or not notifications for a first application are permitted to be output during the first mode;
   while displaying the first editing user interface, detecting, via the one or more input devices, one or more user inputs that change the setting;
   after exiting the first editing user interface, activating the first mode;
   while the computing device is in the first mode, detecting an occurrence of an event corresponding to the first application; and
   in response to detecting the occurrence of the event corresponding to the first application:
      in accordance with a determination that the setting permits notifications for the first application to be output while the computing device is in the first mode, outputting a notification corresponding to the event; and
in accordance with a determination that the setting does not permit notifications for the first application to be output while the computing device is in the first mode, forgoing outputting the notification corresponding to the event.

10. The method of claim 9, wherein the first editing user interface includes an option to specify contacts from whom communication notifications are displayed while the computing device is in the first mode.

11. The method of claim 9, wherein the first editing user interface includes an option to add an application icon to a home screen displayed while the computing device is in the first mode.

12. The method of claim 11, wherein:
the home screen displayed while the computing device is in the first mode includes an application icon for a reminder application; and
the first editing user interface includes a setting for configuring which reminder notifications are displayed by the reminder application while the computing device is in the first mode.

13. The method of claim 9, wherein the first editing user interface includes an affordance for adjusting network settings while the computing device is in the first mode.

14. The method of claim 9, wherein displaying the graphical indication of the first mode includes displaying a summary of settings available in the first editing user interface.

15. The method of claim 9, wherein the first mode is one of a plurality of distinct modes for the computing device.

16. The method of claim 15, including:
while displaying the first editing user interface, detecting a user input that includes a horizontal component; and
in response to detecting the user input that includes the horizontal component, displaying a second editing user interface for a second mode of the plurality of distinct modes, wherein the second mode is different from the first mode.

17. A non-transitory computer readable storage medium storing one or more programs, the one or more programs comprising instructions which, when executed by a computing device with a display device and one or more input devices, cause the computing device to:
display, via the display device, a graphical indication of a first mode;
while displaying the graphical indication of the first mode, receive, via the one or more input devices, a request to edit the first mode;
in response to receiving the request to edit the first mode, display, via the display device, a first editing user interface that includes a plurality of editable settings for the first mode, including a visual representation of a setting for whether or not notifications for a first application are permitted to be output during the first mode;
while displaying the first editing user interface, detect, via the one or more input devices, one or more user inputs that change the setting;
after exiting the first editing user interface, activate the first mode;
while the computing device is in the first mode, detect an occurrence of an event corresponding to the first application; and
in response to detecting the occurrence of the event corresponding to the first application:
in accordance with a determination that the setting permits notifications for the first application to be output while the computing device is in the first mode, output a notification corresponding to the event; and
in accordance with a determination that the setting does not permit notifications for the first application to be output while the computing device is in the first mode, forgo outputting the notification corresponding to the event.

18. The non-transitory computer readable storage medium of claim 17, wherein the first editing user interface includes an option to specify contacts from whom communication notifications are displayed while the computing device is in the first mode.

19. The non-transitory computer readable storage medium of claim 17, wherein the first editing user interface includes an option to add an application icon to a home screen displayed while the computing device is in the first mode.

20. The non-transitory computer readable storage medium of claim 19, wherein:
the home screen displayed while the computing device is in the first mode includes an application icon for a reminder application; and
the first editing user interface includes a setting for configuring which reminder notifications are displayed by the reminder application while the computing device is in the first mode.

21. The non-transitory computer readable storage medium of claim 17, wherein the first editing user interface includes an affordance for adjusting network settings while the computing device is in the first mode.

22. The non-transitory computer readable storage medium of claim 17, wherein displaying the graphical indication of the first mode includes displaying a summary of settings available in the first editing user interface.

23. The non-transitory computer readable storage medium of claim 17, wherein the first mode is one of a plurality of distinct modes for the computing device.

24. The non-transitory computer readable storage medium of claim 23, the one or more programs comprising instructions which, when executed by the computing device, cause the computing device to:
while displaying the first editing user interface, detect a user input that includes a horizontal component; and
in response to detecting the user input that includes the horizontal component, display a second editing user interface for a second mode of the plurality of distinct modes, wherein the second mode is different from the first mode.

* * * * *